United States Patent
Dotsey et al.

(10) Patent No.: US 10,647,379 B1
(45) Date of Patent: May 12, 2020

(54) BICYCLE TRAILER

(71) Applicant: Burley Design LLC, Eugene, OR (US)

(72) Inventors: Mike Dotsey, Chester Springs, PA (US); Evan Aamodt, Philadelphia, PA (US); Andrew J. Miller, Phoenixville, PA (US); Patrick Nolan, Royersford, PA (US); Noah Dingler, Phoenixville, PA (US); Sarah Campbell, Downingtown, PA (US); Lindsay Malatesta, Lansdale, PA (US); Erin H. Morrissey, Mont Claire, PA (US); Scott Spence, Eugene, OR (US); Jon Anderegg, Eugene, OR (US)

(73) Assignee: Burley Design LLC, Eugene, OR (US)

( * ) Notice: Subject to any disclaimer, the term of this patent is extended or adjusted under 35 U.S.C. 154(b) by 180 days.

(21) Appl. No.: 15/990,414

(22) Filed: May 25, 2018

Related U.S. Application Data

(60) Provisional application No. 62/524,759, filed on Jun. 26, 2017.

(51) Int. Cl.
| | | |
|---|---|---|
| *B62K 27/12* | (2006.01) | |
| *B62K 27/02* | (2006.01) | |
| *B62K 27/00* | (2006.01) | |
| *B62K 27/06* | (2006.01) | |

(52) U.S. Cl.
CPC ............ *B62K 27/12* (2013.01); *B62K 27/006* (2013.01); *B62K 27/02* (2013.01); *B62K 27/06* (2013.01)

(58) Field of Classification Search
CPC ...... B62K 27/02; B62K 27/003; B62K 27/12; B62K 27/006
See application file for complete search history.

(56) References Cited

U.S. PATENT DOCUMENTS

| | | | | |
|---|---|---|---|---|
| 559,761 | A * | 5/1896 | Trancle-Armand ... | B62K 27/12 280/204 |
| 5,427,396 | A * | 6/1995 | Gore .................... | B62D 63/067 224/320 |
| 6,481,735 | B1 * | 11/2002 | Hilk ..................... | B62K 27/006 280/204 |
| 7,367,745 | B2 * | 5/2008 | Lu ......................... | B62K 27/12 301/111.06 |

(Continued)

FOREIGN PATENT DOCUMENTS

CN 208746180 U * 4/2019

*Primary Examiner* — Kevin Hurley
(74) *Attorney, Agent, or Firm* — Klarquist Sparkman, LLP

(57) ABSTRACT

A bicycle trailer has a frame with a hitch portion that comprises first and second yoke arms with respective first end and second end portions. Skewer engagement latches can be coupled to the second end portions of the yoke arms. The skewer engagement latches can have stops that pivot between stop open and closed positions. In the stop open positions, respective end portions of a bicycle skewer can inserted into or separated from the latches. In the stop closed positions, respective end portions of the bicycle skewer, if positioned in respective latches, are retained coupled to the yoke arms by the latches. The stops are moved between open and closed positions by an actuator, such as by respective cable portions attached to the stop portions. Desirably the actuator simultaneously moves the stops between the open and closed positions. The latches can have skewer engagement surfaces that are least in part spherical.

37 Claims, 24 Drawing Sheets

(56) References Cited

U.S. PATENT DOCUMENTS

| | | | |
|---|---|---|---|
| 8,814,193 B2 * | 8/2014 | Barnes | B62K 27/006 280/204 |
| 2005/0173887 A1 * | 8/2005 | Chen | B62K 27/12 280/204 |
| 2019/0300099 A1 * | 10/2019 | Thomas | B62K 27/006 |

* cited by examiner

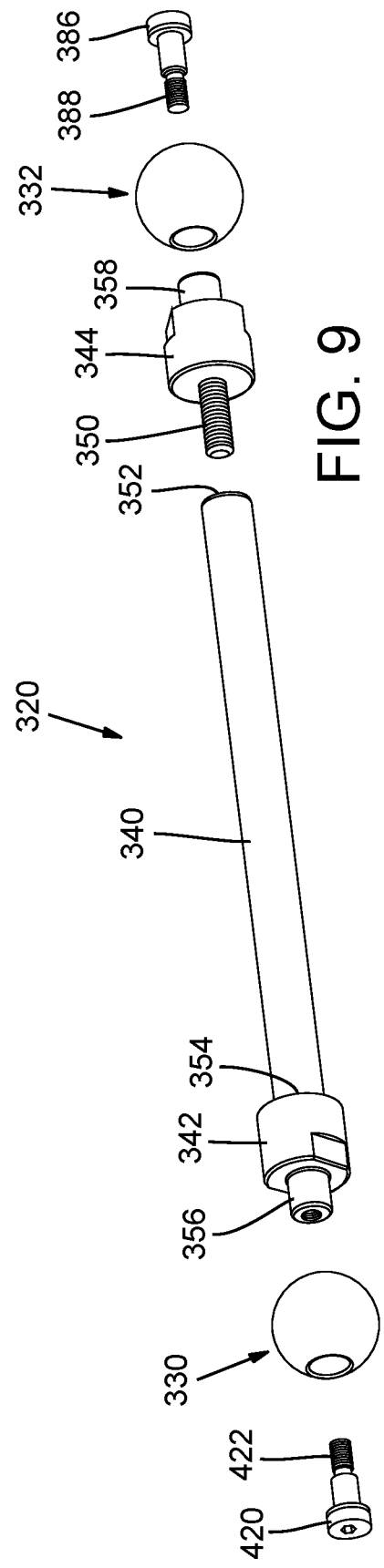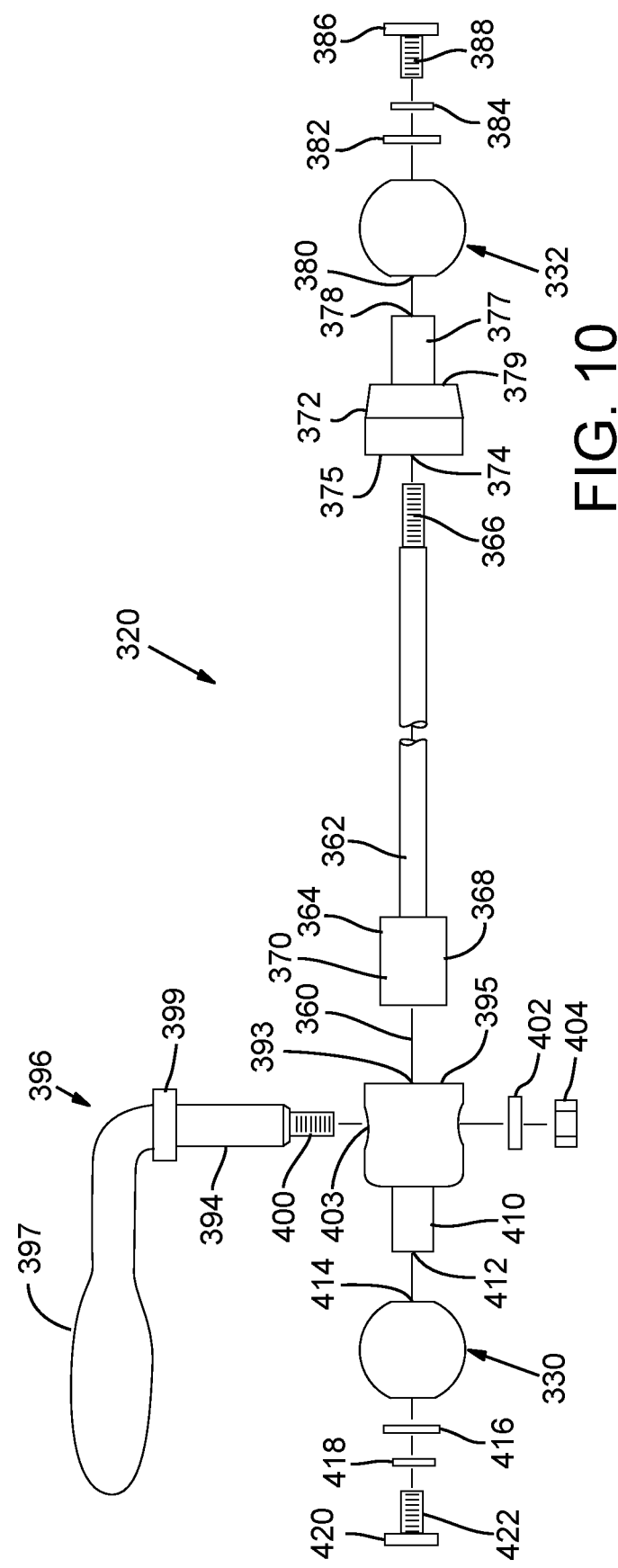

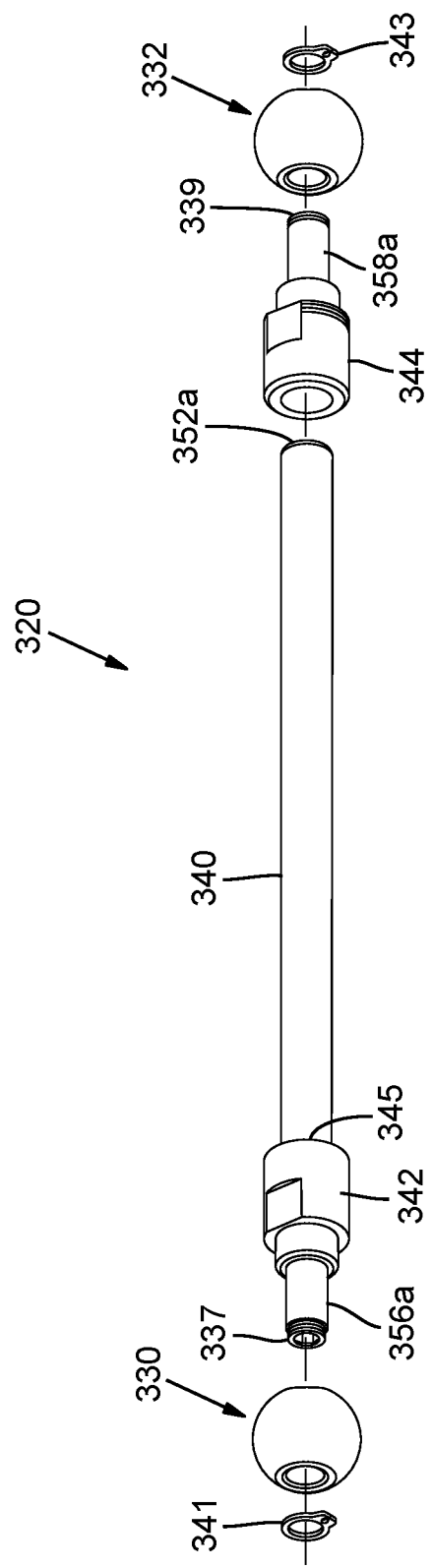

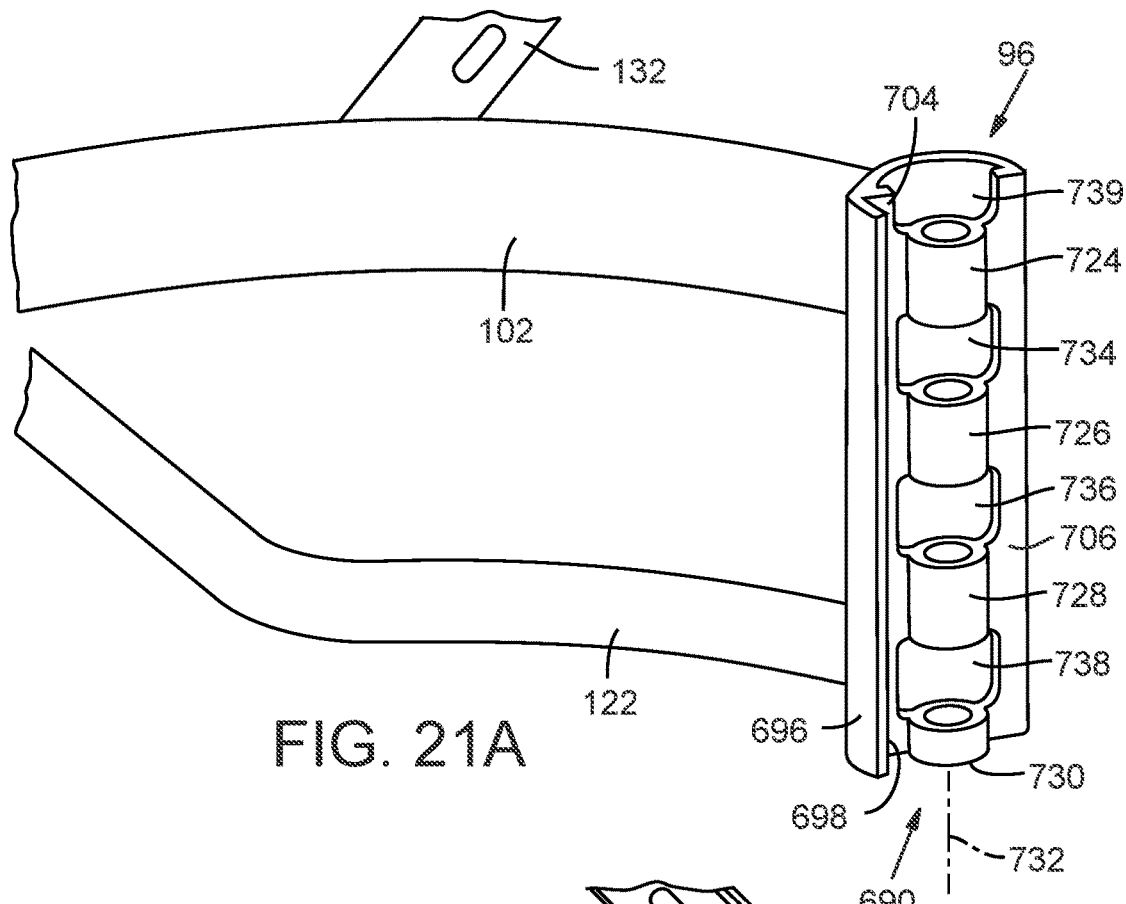
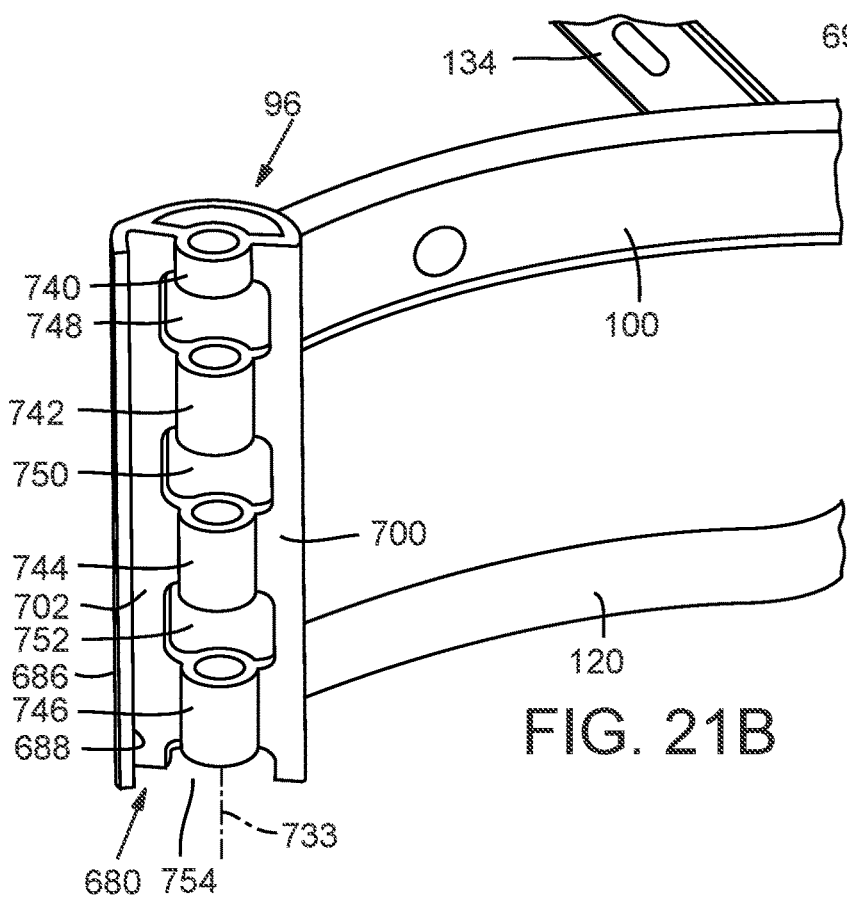

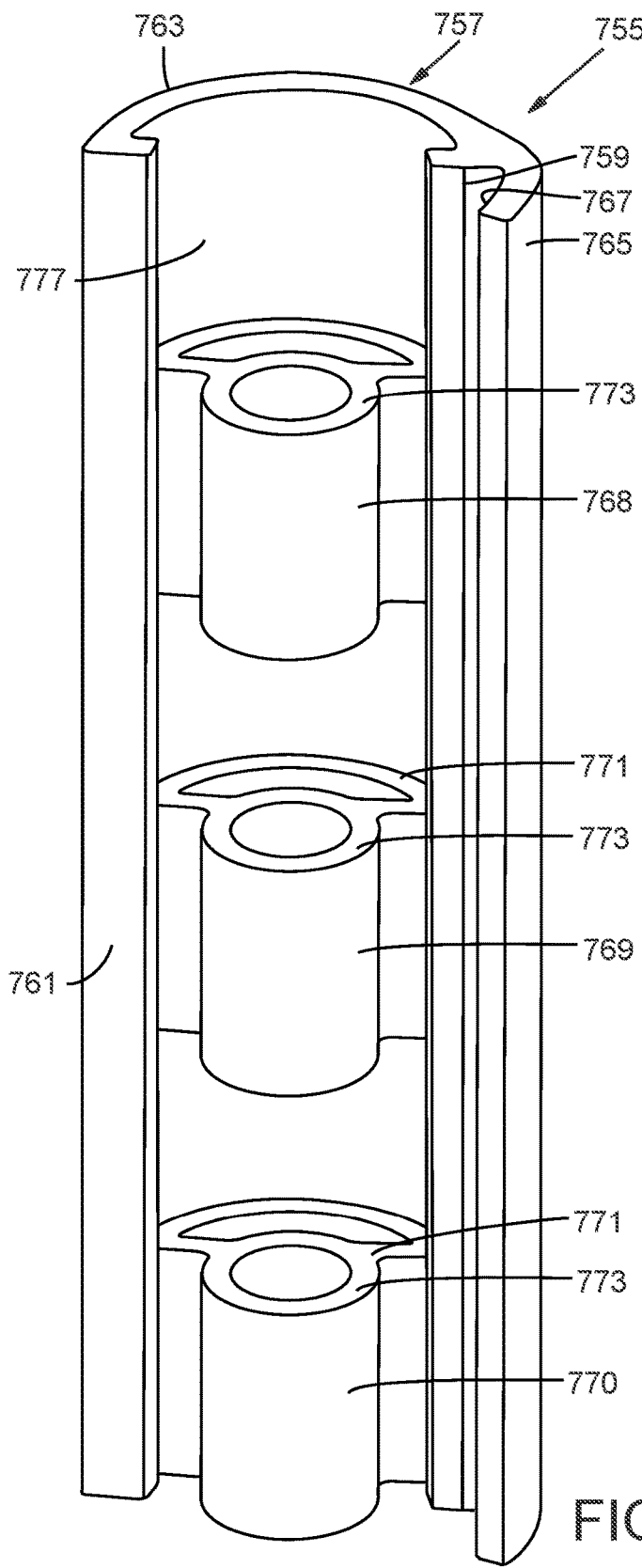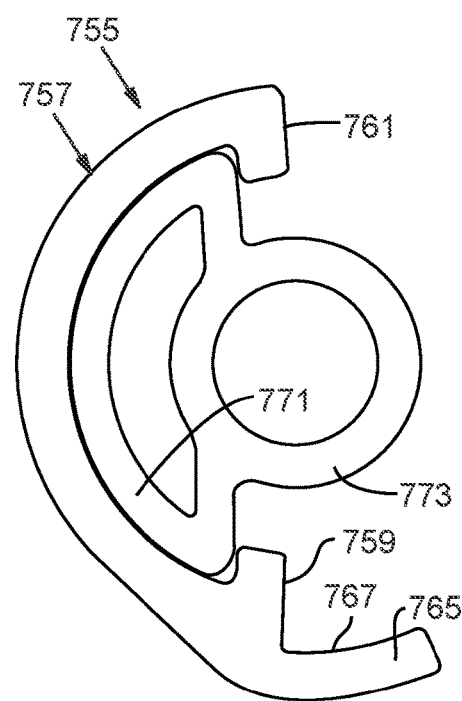
FIG. 22A
FIG. 22B

BICYCLE TRAILER

CROSS REFERENCE TO RELATED APPLICATION

This application claims the benefit of U.S. Provisional Application Ser. No. 62/524,759, entitled BICYCLE TRAILER, filed on Jun. 26, 2017, which is incorporated by reference herein.

FIELD

This disclosure relates to bicycle trailers and to components used in connection with such trailers.

SUMMARY

A bicycle trailer has a frame with a hitch portion that comprises first and second yoke arms with respective first end and second end portions. Skewer engagement latches can be coupled to the second end portions of the yoke arms. The skewer engagement latches can have stops that pivot between stop open and closed positions; In the stop open positions, respective end portions of a bicycle skewer can inserted into or separated from the latches. In the stop closed positions, respective end portions of the bicycle skewer, if positioned in respective latches, are retained coupled to the yoke arms by the latches. The stops are moved between open and closed positions by an actuator, such as by respective cable portions attached to the stop portions. Desirably the actuator simultaneously moves the stops between the open and closed positions. The latches can have skewer engagement surfaces that are least in part spherical.

In accordance with an embodiment, a bicycle trailer comprises a bicycle trailer frame having a front frame portion and a rear frame portion. A rear wheel can be coupled to the rear frame portion of the frame. A hitch portion can be pivotally coupled to the front frame portion of the frame. The hitch portion comprises first and second yoke arms extending forwardly from the front frame portion, each yoke arm having respective first end and second end portions. A pivot desirably couples the first end portion of each arm to the front frame portion for pivoting about an upright axis relative to the front frame portion. With this construction, the distance between the second end portions of the first and second yoke arms is adjustable by pivoting the second ends of the respective yoke arms toward and away from one another about the upright axis. Also, a first skewer engagement latch can be coupled to the second end portion of the first yoke arm and a second skewer engagement latch can be coupled to the second end portion of the second yoke arm. The first skewer engagement latch desirably comprises a first housing with a first opening sized to receive a first end portion of a skewer that supports the rear wheel of a bicycle. The first skewer engagement latch can comprise a first stop coupled to the first housing and movable to first stop closed and open positions. In the first stop closed position, the first stop closes the first opening sufficiently to block the removal of the first latch from the first end portion of the skewer and thereby blocks the decoupling of the first yoke arm from the first end portion of the skewer. In the first stop open position, the first stop opens the first opening sufficiently to permit passage of the first end portion of the skewer through the first opening. The second skewer engagement latch can be like the first such latch. Thus, the second skewer engagement latch can comprise a second housing with a second opening sized to receive a second end portion of the skewer opposite to the first end portion of the skewer. The second latch can comprise a second stop coupled to the second housing and movable to second stop open and closed positions. In the second stop closed position, the second stop closes the second opening sufficiently to block the removal of the second latch from the second end portion of the skewer and thereby blocks the decoupling of the second yoke arm from the second end portion of the skewer. In the second stop open position, the second stop opens the second opening sufficiently to permit passage of the second end portion of the skewer through the second opening. In addition, an actuator can be coupled to the first and second stops and operable to move the first stop from the first stop closed position to the first stop open position and to move the second stop from the second stop closed position to the second stop open position. The actuator can comprise a first cable having a first cable first end portion and a first cable second portion spaced from the first cable first end portion. In addition, the actuator can comprise a second cable having a second cable first end portion and a second cable second portion spaced from the second cable first cable end portion. The first and second cables can be joined together and can be portions of a single cable. Also, the first cable first end portion can be coupled to the first stop and the second cable first end portion can be coupled to the second stop. With this construction, movement of the first cable second portion in a first cable first direction moves the first stop from the first stop closed position to the first stop open position and movement of the first cable second portion in a first cable second direction moves the first stop from the first stop open position to the first stop closed position. In addition, movement of the second cable second portion in a second cable first direction moves the second stop from the second stop closed position to the second stop open position and movement of the second cable second portion in a second cable direction moves the second stop from the second stop open position to the second stop closed position.

In accordance with an aspect, the actuator can comprise a first cable mover coupled to the first cable second portion and a second cable mover coupled to the second cable second portion. The first and second cable movers are coupled to the frame. The first cable mover is movable relative to the frame between first and second cable mover positions to move the first cable second portion in the respective first cable first and second directions. In addition, the second cable mover is movable relative to the frame between first and second cable mover positions to move the second cable second portion in the respective second cable first and second directions.

In accordance with a further aspect, the first cable mover and the second cable mover can comprise a common cable mover coupled to frame and to the first cable second portion and to the second cable second portion. The common cable mover can be movable relative to the frame between first and second cable mover positions to simultaneously move the first cable second portion in the first cable first direction and the second cable second portion in the second cable first direction, wherein simultaneous movement of the first cable second portion in the first cable first direction and movement of the second cable second portion in the second cable first direction simultaneously moves the first stop to the first stop open position and the second stop to the second stop open position.

The cable mover or movers can comprise at least one of a lever, rotary dial, push button or push bar, or a pull cord. Desirably, the first and second skewer engagement latches can be lowered onto the skewer pivot elements and the arms can move to a latched state without the need to actuate the latches such as by using a latch release. In this example, the latch release need only be operated to release the latches when they are coupled to skewer pivot elements.

As a further aspect, the cable mover or movers can be supported by the hitch portion.

As yet another aspect, the hitch portion can comprise a first handle arm extending upwardly and rearwardly from the first yoke arm and a second handle arm extending upwardly and rearwardly from the second yoke arm. In addition, the cable over or movers can be coupled to or supported by the first and second handle arms.

In accordance with another aspect, a handle arm can extend between the first and second handle arms and the cable mover or cable movers can be carried by the handle.

As a more specific aspect, the actuator can comprise a lever pivotally coupled to the frame and coupled to the first cable second portion and to the second cable second portion. With this construction, pivoting the lever in a first lever pivot direction simultaneously moves the first cable second portion and the second cable second portion in the first direction. In addition, pivoting the lever in a second lever pivot direction opposite to the first lever pivot direction simultaneously moves the first cable second portion and the second cable second portion in the second direction. The lever can be supported by the hitch portion, including being coupled to handle arms extending upwardly from the respective yoke arms. In a specific example, a handle can extend between the first and second handle arms and the lever can extend between the first and second handle arms at a location below the handle. Also, the handle can be positioned at an elevation higher than the elevation of the front frame portion.

As another aspect, the bicycle trailer can comprise means for moving the first cable to move the first stop from the first stop closed position to the first stop open position and for moving the second cable to move the second stop from the second stop closed position to the second stop open position.

As a further aspect, one or more springs can be coupled to the cable mover or movers and to the frame, e.g. to a handle of a hitch coupled to the frame. Desirably the spring operates to bias the cable mover, or movers if more than one, to the first cable mover position to thereby bias the first stop to the first stop closed position and the second stop to the second stop closed position.

As more specific aspects, the bicycle trailer can comprise a first handle arm with a first handle arm first end portion connected to the first yoke arm and a first handle arm second end portion spaced from the first handle arm first end portion, the first handle arm extending upwardly from the first yoke arm; a second handle arm with a second handle arm first end portion connected to the second yoke arm and a second handle arm second end portion spaced from the second handle arm first end portion, the second handle arm extending upwardly from the second yoke arm; and a handle cross member interconnecting the first handle arm second end portion and the second handle arm second end portion; at least one lever carried by the handle cross member and being coupled to the front frame portion through the first and second handle arms and through the first and second yoke arms and the pivot, the at least one lever being coupled to the first cable second end portion and to the second cable second end portion, the at least one lever being movable from a first position to a second position, the at least one lever being movable in a first direction to the second position and in a second direction to the first position, wherein movement of the at least one lever from the first position to the second position moves the first and second stops to their respective first and second stop open positions. The first and second handle arms can extend upwardly and rearwardly to position the handle above the front frame portion.

As a further aspect, the first cable can extend along the first yoke arm and within the interior of the first handle arm to the handle; and the second cable extends along the second yoke arm and within the interior of the second handle arm to the handle. The first and second handle arms and handle can comprise a U-shaped handle support for the at least one cable mover such as a lever.

As still another aspect, the first and second latches each can comprise respective spherical skewer engagement surfaces.

As yet another aspect, the first end of the first yoke arm can comprise a first hinge portion and the first end of the second yoke arm can comprise a second hinge portion. The first and second hinge portions can interfit with one another and comprise portions of the pivot. Desirably, components of the pivot hold the hinge portions and thereby the yoke arms together as a yoke arm assembly after they have been assembled. The bicycle trailer can further comprising a hinge pin that couples the assembled first and second hinge portions and yoke arms to the trailer frame such as the frame front portion. In addition, the longitudinal axis of the hinge pin can comprise an upright axis about which the yoke arms pivot. In addition, the hinge pin can be removable; such that removal of the hinge pin allows detachment of the yoke arm assembly from the bicycle trailer frame.

As another aspect, the first and second hinge portions can comprise stops positioned to limit the extent to which the minimum and maximum distances between the second end portions of the first and second yoke arms.

As yet another aspect, a bicycle trailer can comprising a cam and cam lever coupled to the hinge pin, the cam lever shifting the cam to a cam locking position in which the removal of the hinge pin is prevented and to a cam unlocking position to allow removal of the hinge pin. As additional aspects, the bicycle trailer can be is combined with a skewer for the rear wheel of a bicycle, the skewer comprising a first end portion comprising a first spherical latch engagement surface portion and a second skewer end portion comprising a second spherical latch engagement surface portion; the first skewer engagement latch comprising a first latch spherical engaging surface portion that is positioned against the first spherical latch engagement surface portion at least when the first skewer engagement latch receives the first skewer end portion and the first stop is in the first stop closed position; and second skewer engagement latch comprising a second latch spherical engaging surface portion that is positioned against the second spherical latch engagement surface portion at least when the second skewer engagement latch receives the second skewer end portion and the second stop is in the first stop closed position.

As further aspects, the bicycle trailer can be combined with a skewer comprising a skewer body having first and second skewer body end portions, wherein each of the first and second skewer body end portions comprises respective first and second latch engagement surface portion, wherein at least a portion of each of the first and second latch engagement surface portions are spherical, wherein the first skewer engagement latch comprising a first skewer end portion engagement surface and the second skewer engagement latch comprising a second skewer end portion engagement surface, the first and second skewer end portion engagement surfaces being at least in part spherical, the first latch engagement surface portion engaging the first skewer end portion engagement surface at least when the first skewer engagement latch receives the first skewer end portion and the first stop is in the first stop closed position, and the second latch engagement surface portion engaging the second skewer end portion engagement surface at least when the second skewer engagement latch receives the second skewer end portion and the second stop is in the second stop closed position.

As another aspect, the skewer has a longitudinal axis. In addition, the first and second latch engaging surface portions comprise portions of respective first and second latch couplers. Each of the latch couplers can include respective side portions through which the longitudinal axis of the skewer extends, the first and second latch engaging surface portions of the respective first and second latch couplers being entirely spherical except for the first and second side portions.

In accordance with an embodiment, a bicycle trailer can comprise: a bicycle trailer frame; a hitch portion coupled to the frame; the hitch portion comprising first and second yoke arms extending forwardly from the front frame portion, each yoke arm having respective first end and second end portions; a first skewer engagement latch coupled to the second end portion of the first yoke arm and a second skewer engagement latch coupled to the second end portion of the second yoke arm; the first skewer engagement latch comprising a first housing with a first opening sized to receive a first end portion of a skewer that supports the rear wheel of a bicycle, the first skewer engagement latch comprising a first stop coupled to the first housing and movable to first stop closed and open positions, wherein with the first stop in the first stop closed position, the first stop closes the first opening sufficiently to block the removal of the first latch from the first end portion of the skewer and thereby blocks the decoupling of the first yoke arm from the first end portion of the skewer, and wherein with the first stop in the first stop open position, the first stop opens the first opening sufficiently to permit passage of the first end portion of the skewer through the first opening; the second skewer engagement latch comprising a second housing with a second opening sized to receive a second end portion of the skewer opposite to the first end portion of the skewer, the second latch comprising a second stop coupled to the second housing and movable to second stop open and closed positions, wherein with the second stop in the second stop closed position, the second stop closes the second opening sufficiently to block the removal of the second latch from the second end portion of the skewer and thereby blocks the decoupling of the second yoke arm from the second end portion of the skewer, and wherein with the second stop in the second stop open position, the second stop opens the second opening sufficiently to permit passage of the second end portion of the skewer through the second opening; an actuator coupled to the first and second stops and operable to move the first stop from the first stop closed position to the first stop open position and to move the second stop from the second stop closed position to the second stop open position, the actuator comprising a first cable having a first cable first end portion and a first cable second portion spaced from the first cable first end portion, the actuator comprising a second cable having a second cable first end portion and a second cable second portion spaced from the second cable first cable end portion, the first cable first end portion being coupled to the first stop and the second cable first end portion being coupled to the second stop, wherein movement of the first cable second portion in a first cable first direction moves the first stop from the first stop closed position to the first stop open position and wherein movement of the first cable second portion in a first cable second direction moves the first stop from the first stop open position to the first stop closed position, and wherein movement of the second cable second portion in a second cable first direction moves the second stop from the second stop closed position to the second stop open position and wherein movement of the second cable second portion in a second cable direction moves the second stop from the second stop open position to the second stop closed position.

As still further aspects, the actuator can comprise a first cable mover coupled to the first cable second portion and a second cable mover coupled to the second cable second portion, the first and second cable movers being coupled to the frame, the first cable mover being movable relative to the frame between first and second cable mover positions to move the first cable second portion in the respective first cable first and second directions, the second cable mover being movable relative to the frame between first and second cable mover positions to move the second cable second portion in the respective second cable first and second directions, wherein the first and second cable movers comprise a common cable mover coupled to the first cable second portion and to the second cable second portion, the common cable mover simultaneously moving the first cable second portion and the second cable second portion as the cable mover moves between the first and second cable mover positions. In addition, the cable mover can comprise at least one of a lever, rotary dial, push button or push bar, or a pull cord. Also, the first and second cables can be portions of one cable, wherein the first cable second portion and the second cable second portion are part of the one cable, and wherein the first cable first end portion and second cable first end portion are end portions of the one cable.

As an additional aspect, the hitch portion can comprise a first handle arm extending upwardly and rearwardly from the first yoke arm and a second handle arm extending upwardly and rearwardly from the second yoke arm, a handle extending between the first and second handle arms, and wherein the cable mover is carried by the handle. In addition, the handle can be positioned at an elevation higher than the elevation of the front of the frame.

The features and advantages of the invention will become more apparent from the following detailed description, which proceeds with reference to the accompanying FIGS. It is to be understood that this disclosure encompasses novel and non-obvious elements and aspects disclosed herein alone and in all possible combinations and/or sub-combinations thereof. There is no requirement that an element and/or combination of elements provide any of the advantages and/or satisfy any of the objects set forth herein to be within the scope of this disclosure.

BRIEF DESCRIPTION OF THE DRAWINGS

FIGS. 9 and 9A are respective exploded views of two forms of a skewer that can be used in detachably coupling yoke arms of the bicycle trailer to the skewer and thereby to the rear wheel of a bicycle.

FIG. 10 is an exploded view of an alternative form of skewer with a quick release cam mechanism.

FIGS. 21A and 21B are perspective views of right and left hand portions of an exemplary hinge assembly.

FIG. 22A is a perspective view of an alternative form of a hinge portion for pivotally interconnecting yoke arms.

FIG. 22B is a bottom plan view of the hinge portion of FIG. 23A.

DETAILED DESCRIPTION

The following explanations of terms are provided to better describe the present disclosure and to guide those of ordinary skill in the art in the practice of the present disclosure. As used herein, the words "including" and "having" and their formatives have the same meaning as "comprising and its corresponding formatives. Also, the singular forms "a" or "an" or "the" include plural references unless the context clearly dictates otherwise. The term "or" refers to a single element of stated alternative elements or a combination of two or more elements, unless the context clearly indicates otherwise. The term "coupled to" (e.g. element A is coupled to element B) includes direct connection of the elements and also includes indirect connection of the elements through one or more other elements. The terms "about" and "approximately" with respect to a value or stated range or orientation, unless otherwise stated, means plus or minus ten percent of the recited value, range or orientation.

Examples are described with reference to directions indicated as "above," "below," "upper," "lower," "top", "bottom", "ascending", "descending", and/or the like. These terms are used for convenient description, but do not imply or require any particular spatial orientation. For example, a trailer described as having an upper and lower frame sections is typically oriented in use with the upper frame section above the lower frame section. If the orientation is changed such that the lower frame section is above the upper frame section, the trailer still has the upper frame section, even though it is now oriented in a lower position. The term "and/or" is to be broadly construed to include all possible combinations of elements or items with which the term is used, as well as the elements or items individually. The term "adjacent" means two components are positioned without other components being positioned between the adjacent portions of the two components.

Unless explained otherwise, all technical and scientific terms used herein have the same meaning as commonly understood to one of ordinary skill in the art to which this disclosure belongs. Although methods and materials similar or equivalent to those described herein, suitable methods and materials are described below. The materials, methods, and examples are illustrative only and not intended to be limiting, unless otherwise indicated. Other features of the disclosure will be apparent from the following detailed description.

With reference to FIGS. 1-4, an embodiment of a bicycle trailer 10 in accordance with this disclosure is illustrated.

Figure 4:
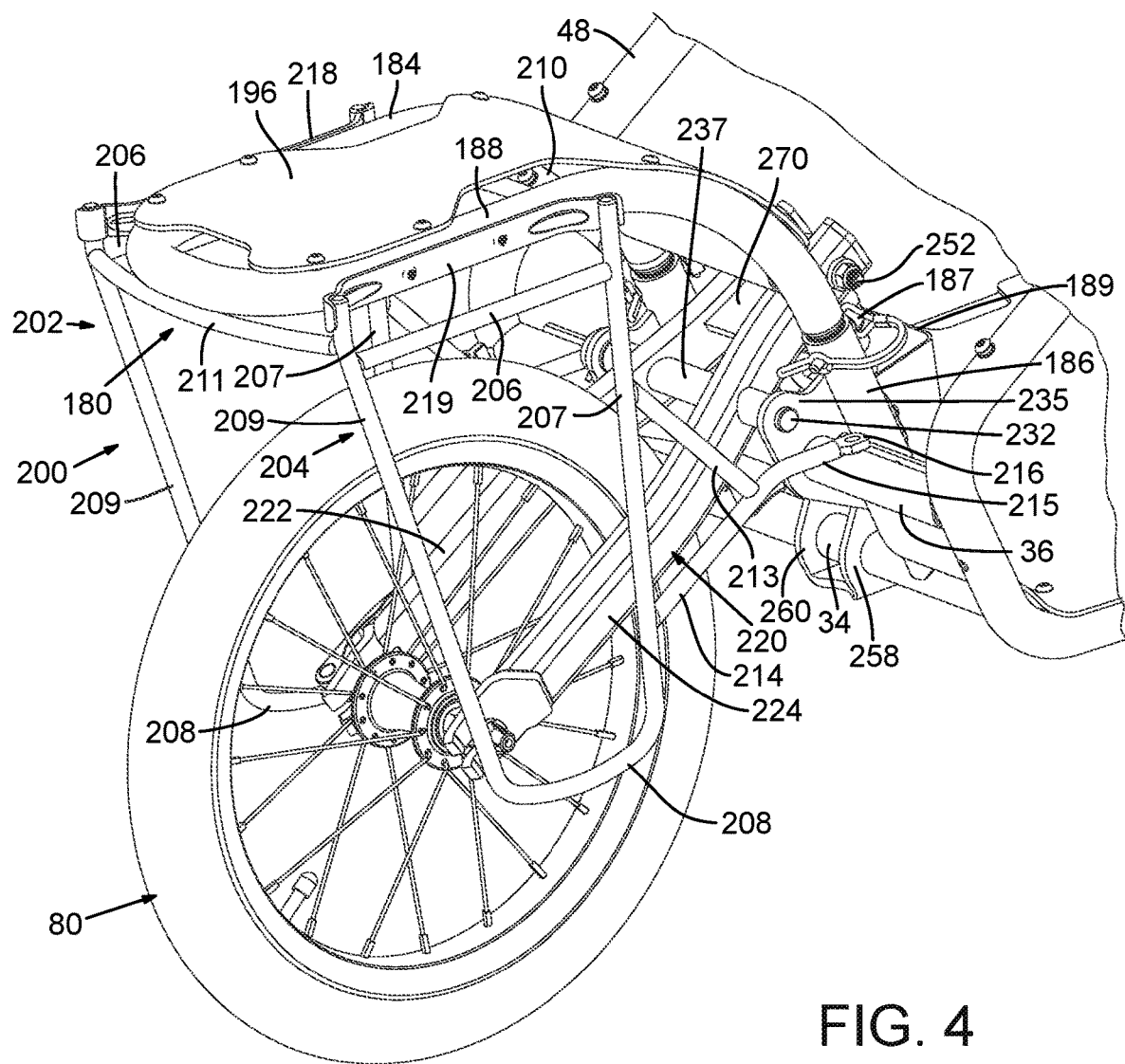
FIG. 4 is a perspective view of the rear portion of the trailer with an exemplary carrier.

The illustrated bicycle trailer 10 comprises a frame 12 comprising a lower frame portion 14 and an upper frame portion 16. The lower frame portion comprises a front lower rail section 20, which can be arcuate or curved with side end portions spaced further from a bicycle 22 than the central portion when the trailer 10 is coupled to the bicycle. The lower frame portion 12 also can comprise first and second spaced apart lower side rail sections 24, 26 extending rearwardly from the respective side end portions of the front section 20. First and second riser frame sections 30, 32 extend upwardly from the respective lower side rail sections 24, 26. Riser sections 30, 32 can comprise rearwardly and upwardly angled risers, such as angled at an angle from 45 to 80 degrees from the respective lower side rail sections, with 70 degrees being a specifically desirable example. As best seen in FIG. 4, a first transversely extending frame cross member 34 can extend across the bottom of the trailer from one of the lower side rail sections 24, 26 to the other. A second frame cross member 36 can extend transversely between the risers 30, 32; such as between locations that are midway along the length of the risers, or from a location that is one-half to two-thirds of the length of the risers from the respective lower side rail sections 24, 26.

Figure 1:
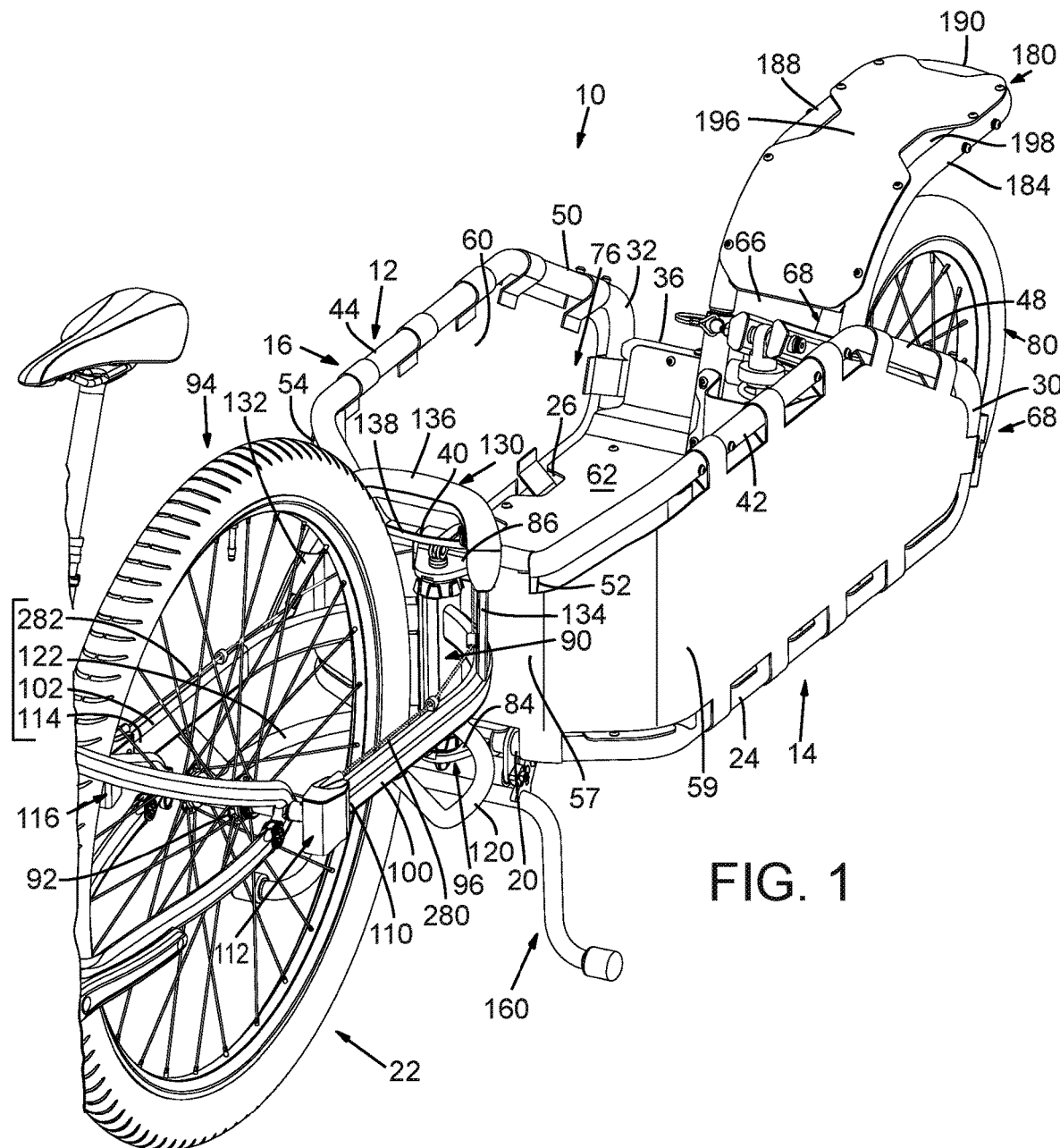
FIG. 1 is a perspective view of an embodiment of a bicycle trailer in accordance with this disclosure shown coupled to the rear axle of a bicycle.
Figure 2:
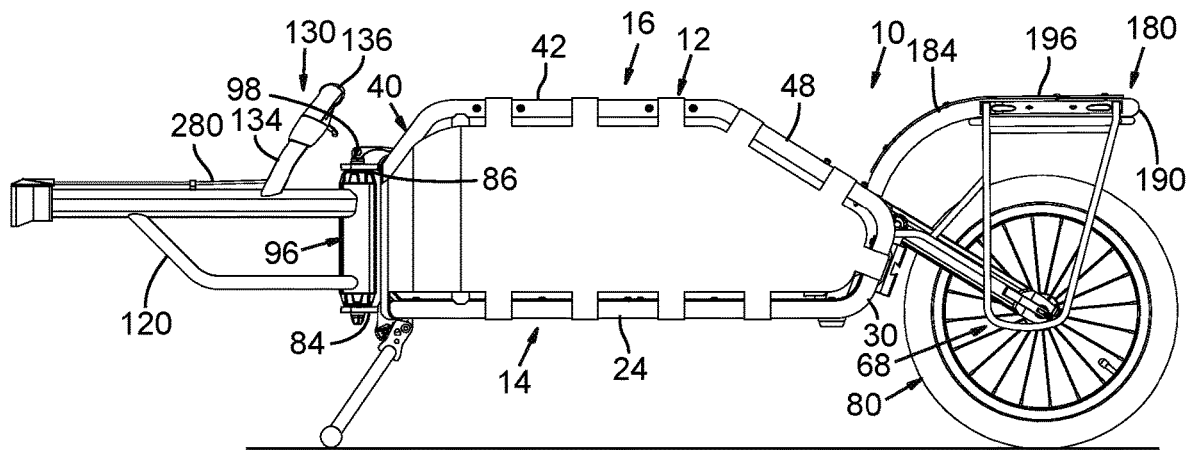
FIG. 2 is a side elevational view of the bicycle trailer of FIG. 1.

The upper frame portion 16 comprises an upper front section 40 (FIG. 1) spaced above lower frame front portion 20. The upper front section 40 can be curved or arcuate, such as like the lower front section 20 and can have respective upper front section end portions. As can be seen in FIG. 2, the front section 40 can also be angled downwardly to converge toward the lower front section 20. In addition, the upper frame 16 can comprise first and second upper side rail sections 42, 44 (see e.g., FIG. 1) extending rearwardly from the respective end portions of the front upper rail section 40. A first descending rail section 48 can extend downwardly and rearwardly from upper side rail section 42 to a location where it joins the upper end of riser 30. A second descending rail section 50 also can extend downwardly and rearwardly from upper side rail section 44 to a location where it joins the upper end of the riser 32. First and second struts 52, 54 can extend between the upper and lower front frame rail sections 40, 20; such as between locations spaced inwardly from the locations where end portions of the front sections 20, 40 join their respective side rail sections 24, 26 and 42, 44.

The illustrated frame 12 defines an interior cargo area 76 bounded by the frame components; although cargo can be carried outside the cargo area, such as strapped onto the top of the trailer.

Figure 3A:
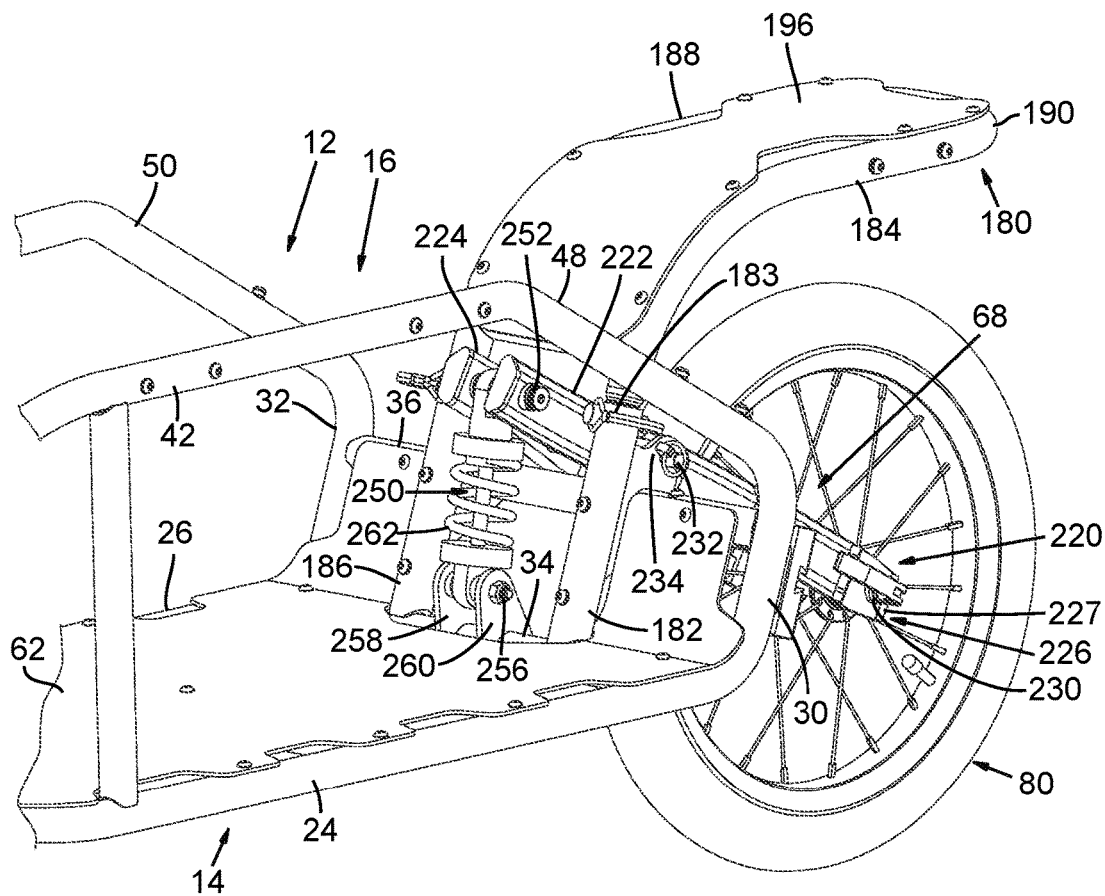
FIG. 3A is an enlarged perspective view of a rear portion of the bicycle trailer of FIG. 1.
Figure 3B:
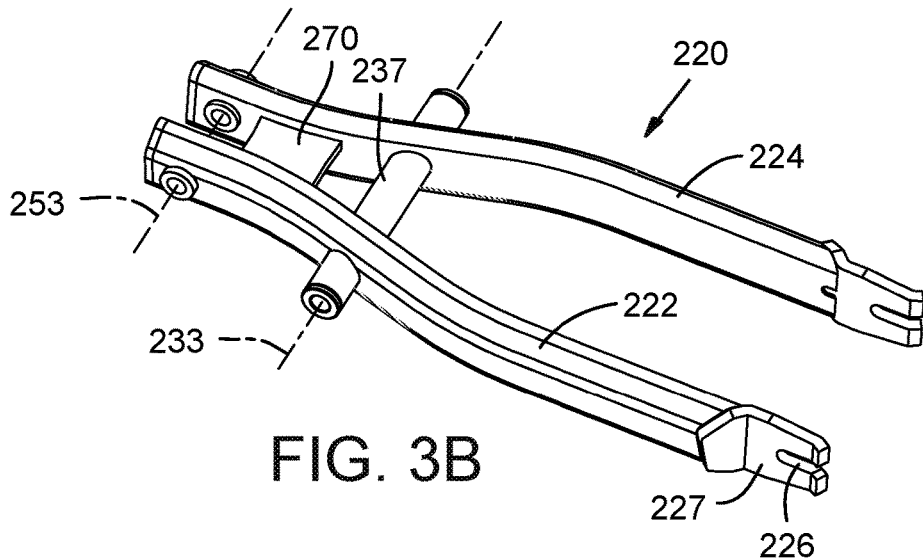
FIG. 3B is a perspective view of one form of a suspension arm included in the trailer of FIG. 1.
Figure 3C:
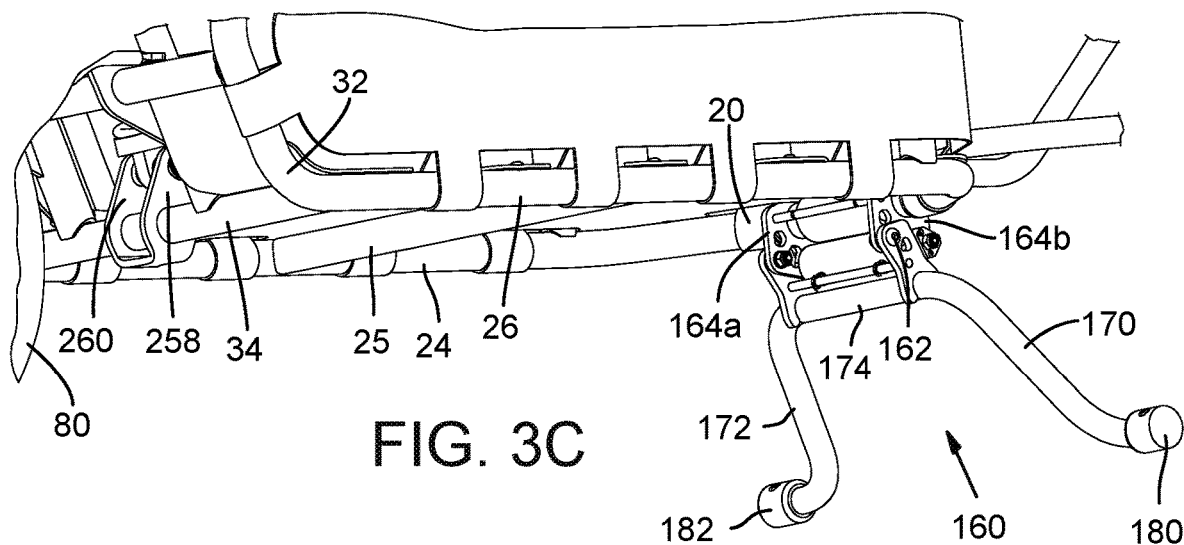
FIG. 3C is a rear perspective view of a portion of the bottom of the bicycle trailer of FIG. 1 and showing a form of kickstand assembly that can be included in the bicycle trailer.

In addition, spaced apart transversely extending lower floor supporting cross members, one being indicated at 25 in FIG. 3C, can be included. The cross members 25 can be parallel to one another and can extend between lower side rail sections 24, 26 to provide load carrying support at the bottom of the trailer.

The frame in this example is a box structure. The frame can have a curved front and rear frame comprising converging frame sections (30, 48 and 32, 50 in this example). The frame sections are desirably made of a durable material such as aluminum and/or steel tubing. The tubing can be bent to shape and sections can be welded or otherwise secured together at joints to create the frame. Polymer materials can also be used for the frame; such as fiber reinforced composite materials. The illustrated frame and bicycle trailer have a desirable ornamental appearance; and can take on other configurations while still achieving the functions of the trailer.

The trailer desirably has a front wall and spaced apart side walls. In FIG. 1, the walls comprise a front wall panel portion 57 and opposed side wall panel portions 59, 60. The front wall panel portion 57 can be coupled to upper and lower front frame sections 40, 20. In addition the side wall panel portion 59 can be coupled to the upper and lower side rail sections 42, 24, to the riser section 30, and to the descending rail section 48. Also, the side wall panel portion 60 can be coupled to the lower and upper side rail sections 26, 44, to the riser section 32, and to the descending rail section 50. The side wall panel portions can be discrete elements of wood, plastic or other panel material, or of a fabric, such as canvas, and/or of a polymer material, such as a polymer mesh. Light reflective fabric can also be used for increased visibility. Alternatively, the side wall panel sections 57, 59 and 60 can be made from a single integrated piece of material that can extend from a riser 30 or 32 at one side of the trailer, around the front of the trailer and to the riser at the opposite side of the trailer. In the form shown, the front and side wall panel portions comprise loops along the edges thereof that are wrapped around the respective portions of the frame rail sections to tie the wall panel portions to the frame sections. These loops can, for example, be hook and eye fabric loops with end portions that are joined together to detachably secure the wall panel portions to the frame. Rivets, bolts, grommets and/or other alternative fasteners can be used.

In addition, a bottom panel portion 62 can be coupled to the lower frame rail sections that form the lower frame portion 14. Bottom panel portion 62 can extend rearwardly from the lower front rail section 20 to the upper ends of the risers 30, 32. The floor 62 can be of plastic that is formed, such as by cutting, and heating and bending to the desired profile. Alternatively, the floor 62 can comprise fiber reinforced polymer, metal, wood, or canvas or other fabric. The floor 62 can be riveted, bolted, adhered by adhesive, or otherwise fastened to the frame 12. A gap 66 can be provided in the floor panel 62 at the rear end of the trailer to accommodate a shock absorbing suspension structure 68 such as described below.

Although other forms of hitch assemblies can be used, a particularly desirable hitch assembly comprises first and second yoke or hitch arms coupled to the rear wheel of a bicycle and more specifically to opposite ends of a skewer that couples the bicycle rear wheel to forks of the bicycle frame. Desirably the yoke arms include latch assemblies at their respective distal ends for selectively engaging a respective end of the skewer. In one desirable form, the latch assemblies can be simultaneously actuated to disengage both latches at the same time to facilitate disconnecting the trailer from the bicycle. Actuation of the latches can be accomplished by a user moving a handle component, such as using one hand, to cause the unlatching of the latches. The handle can be positioned at a location that is nearer to the trailer frame than to the bicycle rear wheel axis to facilitate access to the latch actuating handle component. The yoke arms can be pivotally coupled to the trailer frame such that the spacing between the distal ends of the yoke arms can be varied by pivoting the arms toward or away from one another to accommodate bicycles with different rear axle widths. Also, a skewer with spherical latch engaging surfaces accommodates relative movement between the trailer and rear wheel axle, such as when the bicycle turns or encounters partial obstructions, such as bumps in the road.

With specific reference to FIGS. 1 and 2, a first yoke supporting flange 84 can project forwardly from the lower frame rail section 20 and second yoke supporting flange 86 can project forwardly from the upper front rail section 40 at a location overlaying the flange 84. The flanges 84, 86 are desirably positioned to be intersected by a vertical plane extending along the front to rear longitudinal centerline of the trailer. A trailer to bicycle coupling or hitch structure is desirably included in the trailer for use in coupling the trailer to the bicycle rear axle 92, or skewer that comprises the axle of a rear wheel 94 of a bicycle.

An illustrated hitch structure comprises a yoke structure 90 that comprises yoke arms 100, 102 and a yoke arm connection column 96 positioned between the flanges 84 and 86 that allows the yoke arms to pivot relative to flanges 84,86 for pivoting about the axis of a pivot pin 98 (See FIG. 2) that is coupled to the flanges.

A first yoke arm 100 extends forwardly from the column 96 along one side of the bicycle wheel 94. A second yoke arm 102 extends from the column 96 forwardly along the opposite side of the wheel 94. The column 96 can comprise first and second yoke arm support elements, such as hinge members, that are constructed so as to allow the yoke arms 100 and 102 to pivot toward and away from one another; as will become more apparent from the description below. This allows the spacing between the distal ends of the yoke arms to be varied by pivoting the distal ends 110, 114 of the yoke arms 100, 102 toward or way from one another for coupling to bicycles with tires and axles of different widths. The column 96 can have mechanism for increasing and decreasing the resistance to pivoting motion so that the distal ends remain at a spacing between uses, such as until the resistance is relieved and the spacing between the distal ends is changed. For example, one or more bolts can be tightened against hinge elements to a torque level that binds hinge elements and prevents movement of the distal ends of the yoke arms from applied torque below the torque level. A knob, set screw or collar can comprise a lock out member that can be adjusted to engage the hinge members or the arms to prevent their relative movement until disengaged.

The yoke arm 100 includes a distal end 110 comprising a first skewer engaging latch 112 operable as explained below to selectively and detachably couple the yoke arm 100 to a skewer that couples the rear wheel 94 of the bicycle to the rear fork of a bicycle frame. The second yoke arm 102 includes a distal end 114 with a skewer engaging latch 116 that is operable as explained below to selectively and detachably couple the yoke arm 102 to the rear wheel skewer at the opposite end of the skewer from the end to which latch 112 is coupled. An exemplary form of latch 112, 116 is described below.

A first yoke arm support 120 extends from column 96 to a lower central portion of the yoke arm 100 to provide additional support for yoke arm 100. A second yoke arm support 122 extends forwardly from the column 96 and engages a lower central portion of the yoke arm 102.

In addition, a handle 130 is shown in FIG. 1. The handle 130 comprises a first handle arm 134 extending upwardly and rearwardly from the yoke arm 100 and a second handle arm 132 extending upwardly and rearwardly from the yoke arm 102. A handle cross member 136, which in one form comprises first and second handle components 131, 133 (shown in FIGS. 17A and 17B and described below), is coupled to the upper ends of the handle arms 132, 134. An actuator 138, which can comprise a movable handle component coupled to the handle cross member 136, can be coupled to actuating cables, for use, as explained below, to selectively and simultaneously open the latches 112, 116. When open, the latches can be decoupled from the rear wheel skewer to disconnect the trailer from the bicycle. The latches also desirably function to allow positioning of the latches in a position to engage the respective ends of the skewer to couple the trailer to the bicycle.

Figure 3D:
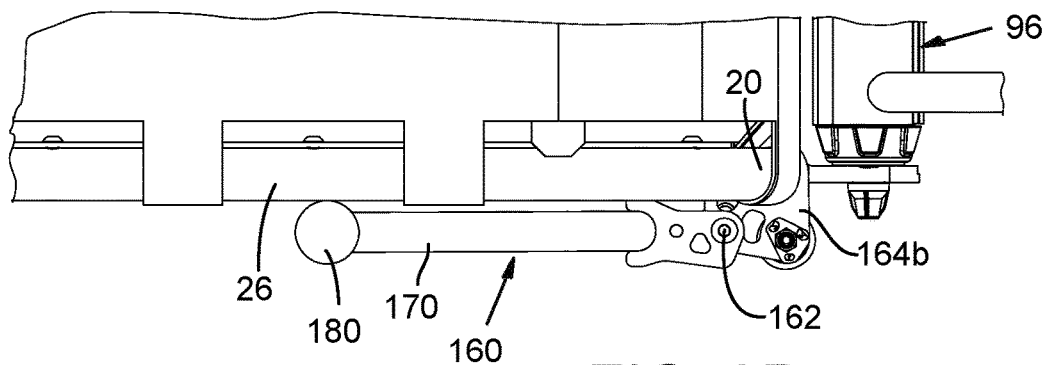
FIG. 3D is a side elevational view of the kickstand assembly of FIG. 3C.

With reference to FIGS. 3C and 3D, a kick stand 160 is pivotally mounted by a pivot pin 162 to a pair of spaced apart brackets 164a, 164b mounted to the lower front rail section 20 of the trailer frame. When deployed, the illustrated kickstand supports the front end of the trailer at a location near the column 96. Trailer rear wheel 80 supports the rear of the trailer. For convenience, spokes that support the rear wheel (or a disk if a disk is used for wheel support) can couple the tire and rim of the rear wheel to a rear wheel axle. The kickstand can have an inverted u-shape with first and second legs 170, 172 and a kickstand cross member 174 at the upper ends of the legs. The kickstand cross member 174 is coupled by the pin 162 to the brackets 164a, 164b.

With a two legged construction, when the kickstand is deployed, a three-point stable support is provided for the trailer comprising the distal end 180 of leg 170, the distal end 182 of leg 172 and the contact between rear wheel 80 and the ground or other trailer supporting surface.

In addition, as can be seen in FIG. 2, in a desirable embodiment, a portion of the handle 130 overlays a portion of the kickstand 160. This facilitates lifting of the trailer and deployment of the kickstand as the handle can be used to lift the trailer at a location above the kickstand.

Referring to FIGS. 1, 2, 3A and 3B, a rear fender and load supporting structure 180 is also included in the illustrated trailer construction. Structure 180 can comprises a fender frame including a first fender supporting leg comprising an upright leg portion 182 connected at a lower end to cross member 34 and resting against or mounted to an interior surface of a cross member 36 (See also FIG. 4). Leg 182 extends upwardly for about one-third to one-half its length and then extends rearwardly and generally horizontally (within plus or minus 20 degrees of horizontal) and more desirably horizontally, to form a substantially horizontally extending support portion 184 of the first fender supporting leg. The fender frame structure can comprise a second fender supporting leg comprising an upright leg portion 186 connected at a lower end to cross member 34 and resting against an interior surface of cross member 36. Leg 186 extends upwardly for about one-third to one-half its length and then extends rearwardly and generally horizontally (within plus or minus 20 degrees of horizontal and more desirably horizontal) to form a substantially horizontally extending support portion 188 of the second fender supporting leg. The fender frame can also include a rear fender frame portion 190 that interconnects the fender support portions 184, 188. In one form the fender frame can comprise a U-shaped frame with that has a lower fender frame portion extending at an acute angle from vertical and a substantially horizontal extending upper fender frame portion projecting rearwardly from the lower fender frame portion.

The fender frame 180 can be fixed to the trailer frame as by rivets, or detachably coupled to the trailer frame such as by bolts or by tube and sleeve connections. This is, for example, the lower leg portions 182, 186 can comprise respective sleeves that slidably receive downwardly projecting rod or end portions of fender support portions 184, 186 that are inserted, respectively, into the sleeves. Detachable retaining pins 183 (FIG. 3A) and 187 (FIG. 4) can be used to selectively hold the inserted fender support portions in the respective sleeves. A fender 196 is shown in FIG. 1 coupled to the fender frame 180, such as by rivets or bolts. The fender can be of any suitable material including wood, bamboo, polymer materials (for example with reinforcing fibers), and metal. The fender 196 desirably includes a plurality of openings, one which is indicated in FIG. 1 by the number 198. These openings can be use as attachment points for bicycle lights and other accessories and for load tie downs, such as when the fender is supporting a longer load that extends beyond the cargo area of the trailer frame.

In FIG. 4, a pannier bag supporting frame 200 is shown carried by the fender support structure 180. The pannier bag carrying frame 200 comprises downwardly extending side bag supporting portions 202, 204. As can be seen in FIG. 4, each bag supporting portion comprises front and rear upright legs or members 207, 209 interconnected by respective upper and lower cross members 206, 208 that comprise rails for engaging bag hanging brackets on a pannier bag. The upper ends of the front legs 207 of the bag supporting portions 202, 204 are interconnected by a cross piece 210 and the upper ends of the rear legs 209 of supporting portions 202, 204 are interconnected by a cross piece 211. A mounting structure extends forwardly from each of the front legs 207. An exemplary mounting structure comprises upper and lower support arms 213, 214 that converge moving away from the respective leg 207, with the lower support arm 214 having a forward extension portion 215 with a distal end 216 having a fastener receiving opening through which a bolt or other fastener can extend to mount the support arm extension 215 to a portion of the trailer frame (to frame cross member 36, FIG. 4, in this example). A first fender frame mounting bracket 218 extends between legs 207, 209 at side 202 of the bag carrier and a second fender frame mounting bracket 219 extends between legs 207, 209 at side 204 of the bag carrier. Each of the mounting brackets 218, 219 is positioned above its associated cross member 206 at the same side of the bag carrier as the respective mounting bracket and extends inwardly from the associated cross member. The mounting brackets 218, 219 can have fastener receiving openings for receiving fasteners, such as bolts, that couple the mounting brackets to the respective fender frame portions 184, 186 (See mounting bracket 219 in FIG. 4). The frame 200 can be made of a lightweight durable material. The frame 200 is of a desirable ornamental design and can be made to appear differently while still carrying out the functions of the bag supporting frame.

With reference to FIGS. 3A and 3B, an exemplary suspension 68 comprises a shock strut or suspension arm 220 with a first side arm portion 222 positioned along one side of the wheel 80 and a second side arm portion 224 positioned on the opposite side of the wheel. The suspension arm portions 222, 224 each include a wheel axle engaging fork for coupling to the rear wheel axle of the trailer. One such fork is indicated at 227 at the distal end 226 of arm portion 222. One end of a rear wheel axle 230 is shown engaged by the fork 227 in FIG. 3A. A central portion of each of the arms 222, 224 is positioned between two suspension brackets (one of which is indicated at 234 in FIG. 3B and the other at 235 in FIG. 4) and pivoted by a pivot pin 232 to these brackets for pivoting about a pivot axis 233 (FIG. 3B). The pin 232 can be inserted through a cross member tube 237 extending through the arms 222, 224 and can be removable to allow the trailer wheel to pivot forwardly into the cargo area of the trailer, as explained below in connection with FIGS. 25 and 26. The fender structure 180 can also be detachably mounted, at the lower ends of fender frame support arms 182, 186, to the frame cross members 34, 36 to allow the fender and fender frame 180 to be detached to permit pivoting of the suspension to this storage position.

The upper end portion of a shock absorber 250 (FIG. 3A) is pivoted by a pin 252 between the forward ends of the two arm portions 222, 224 for pivoting about a first shock absorber pivot axis 253 (FIG. 3B). The lower end of the shock absorber 250 is positioned between first and second brackets 258, 260 that project upwardly from the cross member 34. The shock absorber lower end is pivoted to these brackets by a pivot pin 256. A shock absorbing spring 262 is retained between upper and lower flanges of the shock absorber with the spring being compressed by the downward movement of the arm portions 222, 224 in response to an upward force on the wheel 80; to thereby absorb shock when wheel 80 hits an obstacle or bump. The spring 262 is typically surrounded by a boot or cover (see cover 189 in FIG. 4) to eliminate exposure of the spring. The shock strut 226 as shown in greater detail in FIG. 3B and also comprises a reinforcing flange 270 extending between the arms 222, 224 at a location rearward of the upper and forward end portions of the arms 222, 224.

Figure 5:
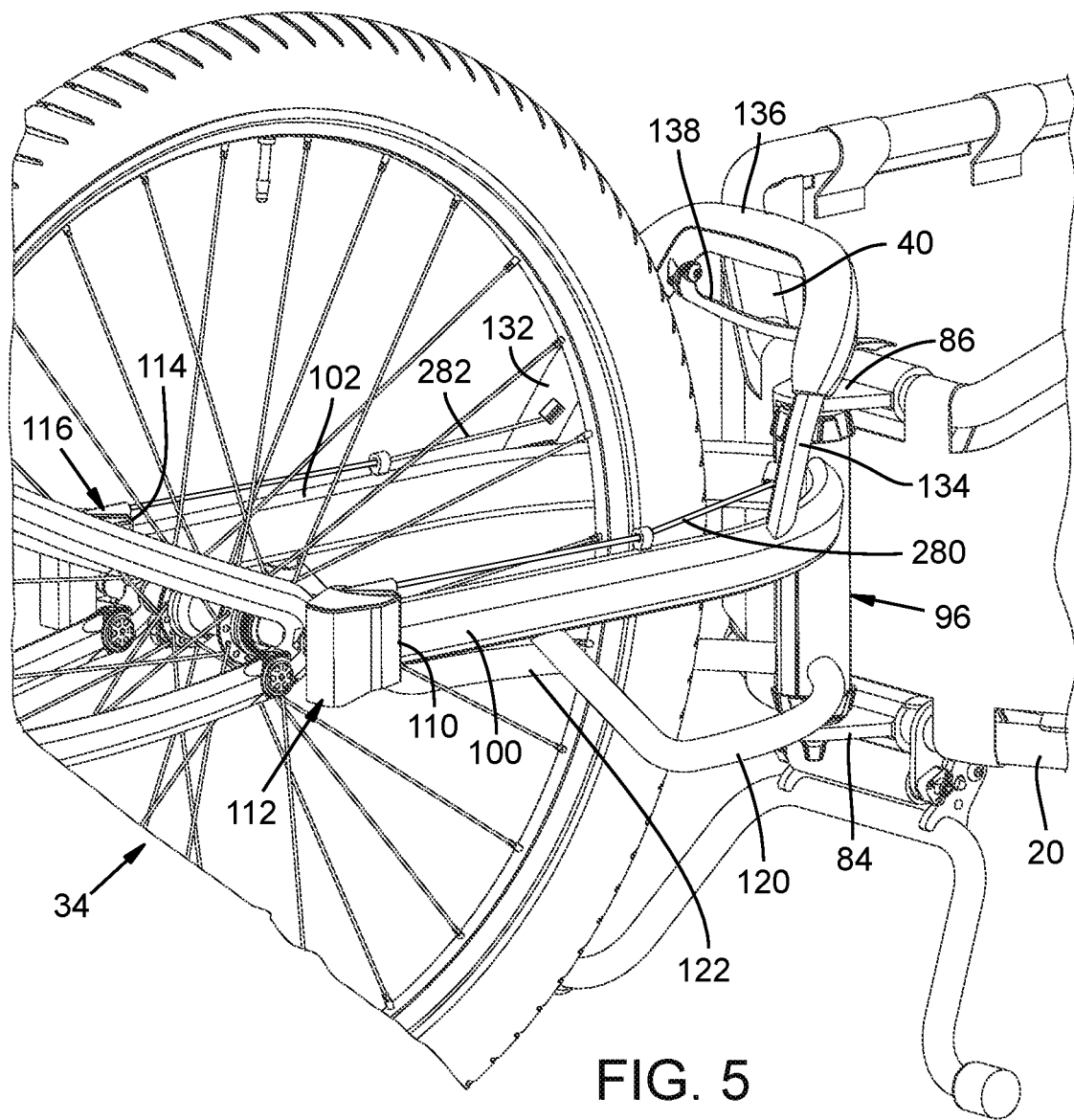
FIG. 5 is a perspective view of the front portion of the bicycle trailer of FIG. 1 with yoke arms of the bicycle trailer shown coupled to a skewer at the rear of a bicycle.

FIG. 5 illustrates the yoke arms 100,102 in position with skewer couplers or latches 112, 114 engaging the skewer of the rear wheel 34 of the bicycle to retain the trailer connected to the bicycle. FIG. 5 also illustrates a latch actuating cable 280 that can comprise a latch actuator that has a first cable first end portion coupled to the latch 112 and a first cable second end portion spaced from the latch 112 and from the first cable first end portion. In addition, FIG. 5 shows a second actuating cable 282 that can comprise a latch actuator that has a second cable first end portion coupled to the latch 116 and a second cable second end portion spaced from the latch 116 and from the second cable first end portion.

In one example, movement of the first cable second end portion in a first cable first direction (e.g. by pulling on the first cable second end portion toward the trailer) moves a first stop (explained below) from a first stop closed position to the first stop open position. In the first stop open position, a bicycle skewer can be received by the first latch. In the first stop closed position, if the first latch has received the bicycle skewer, the first latch engages and is retained on the skewer. Movement of the first cable second end portion in a first cable second direction (e.g. opposite to the first cable first direction) moves the first stop from the first stop open position to the first stop closed position. In addition, movement of the first cable second end portion in a first cable second direction moves the first stop from the first stop open position to the first stop closed position. In this example, movement of the second cable second end portion in a second cable first direction (e.g. by pulling on the second cable second end portion toward the trailer) moves a second stop (explained below) from a second stop closed position to the second stop open position. In the second stop open position, a bicycle skewer can be received by the second latch. In the second stop closed position, if the second latch has received the bicycle skewer, the second latch engages and is retained on the skewer. Movement of the second cable second end portion in a second cable second direction (e.g. opposite to the second cable first direction) moves the second stop from the second stop open position to the second stop closed position. In addition, movement of the second cable second end portion in a second cable second direction moves the second stop from the second stop open position to the second stop closed position.

Desirably, the first cable second end portion and second cable second end portions are moved together to simultaneously move the respective first and second stops between stop open and stop closed positions. For example, the actuator can comprise a common latch operator such as a lever actuator 138 to simultaneously operate each of the latches. The lever actuator 138 can be biased to, for example, move the second end portions of the respective first and second cables in a direction that moves the first and second stops to their closed or latched positions. Less desirably the latches can be individually actuated. The first and second cable end portions can also be interconnected and moved in the desired directions, by an actuator comprising, for example: (i) one or more push buttons or bars, for example, pushing on the interconnected second end portions of the cables to move them in first directions and moving the cables in the second direction when no longer pushed; (ii) one more pull cords that can be used to pull on the second end portions of the first and second cables; (iii) one or more rotary dials coupled to the second cable end portions such that rotating the dial(s) in one direction pulls the second end portions of the cables in one direction and rotating the dial(s) in the opposite direction pushes the second end portions of the cables in the opposite directions. Other mechanisms for pulling and pushing the second end portions of the cables to move the respective first and second stops between open and closed positions can be used. The lever actuator (and other operating mechanism) can be carried by a handle grab member 136 and be a part of a handle 130.

Figure 6:
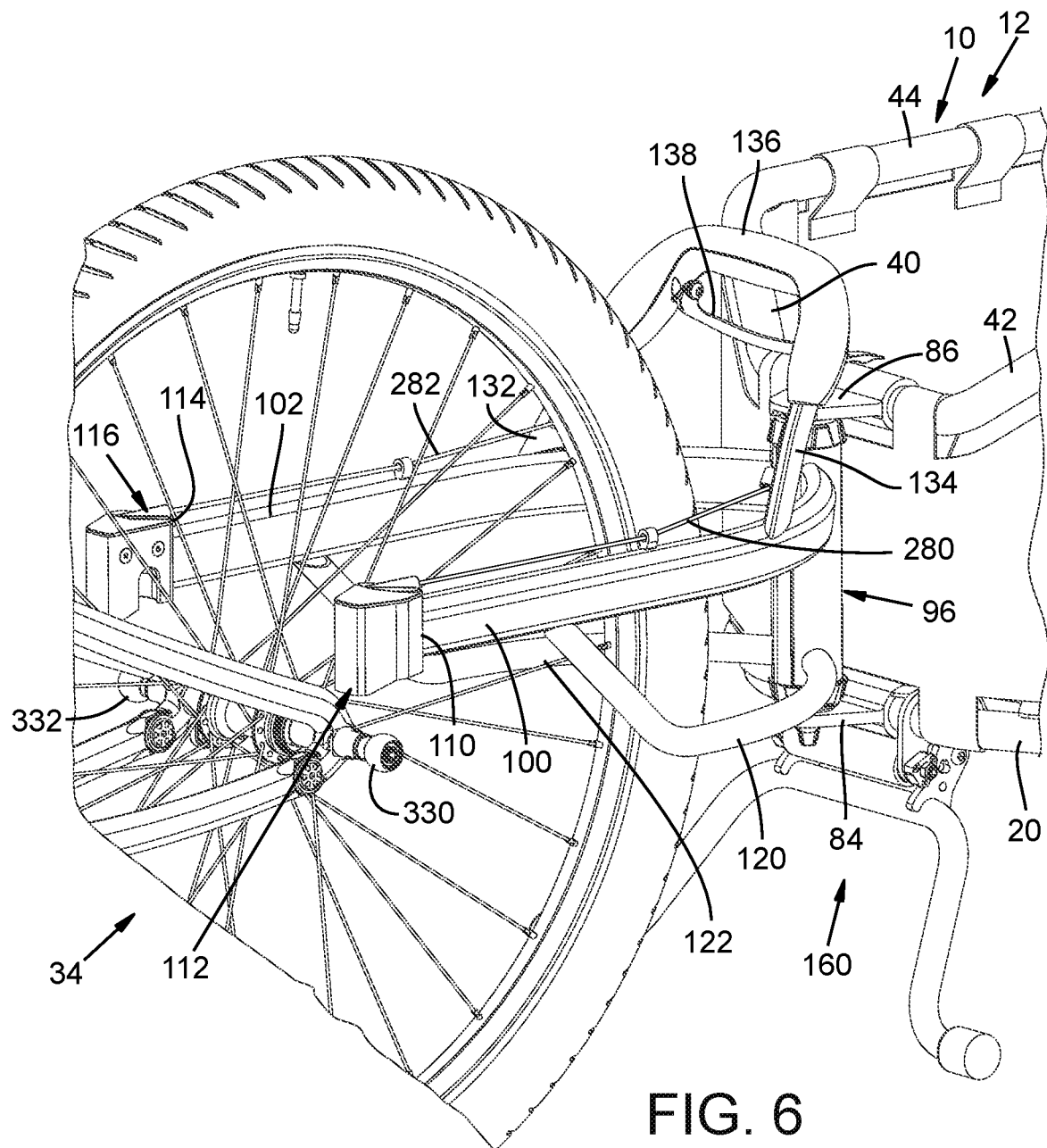
FIG. 6 is a perspective view similar to the view of FIG. 5, but with yoke arms of the bicycle trailer shown decoupled from a coupling portion of a skewer at the rear of a bicycle.
Figure 7:
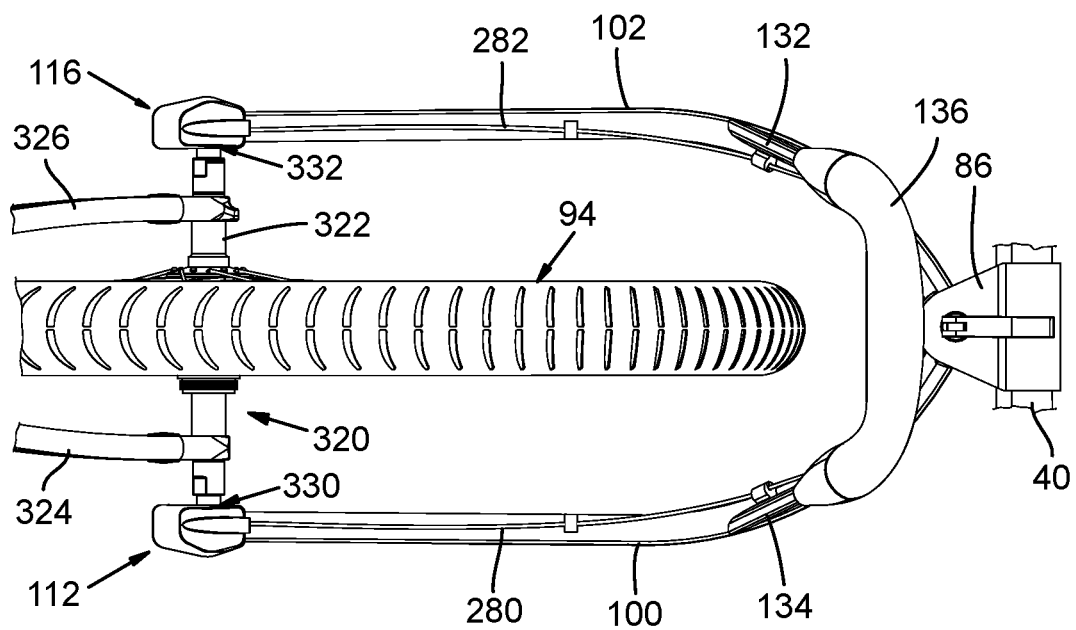
FIG. 7 is a top view of the front portion of the bicycle trailer of FIG. 1 with yoke arms of the bicycle trailer shown coupled to a skewer at the rear of a bicycle.

FIG. 6 illustrates the trailer 10 detached from the rear wheel bicycle skewer and with the kickstand 160 in a deployed condition.

With reference to FIGS. 7-10, an exemplary skewer 320 is shown for use with a trailer hitch coupling assembly comprising the yoke arms 100, 102 and coupling or latch elements 112, 116.

Figure 8:
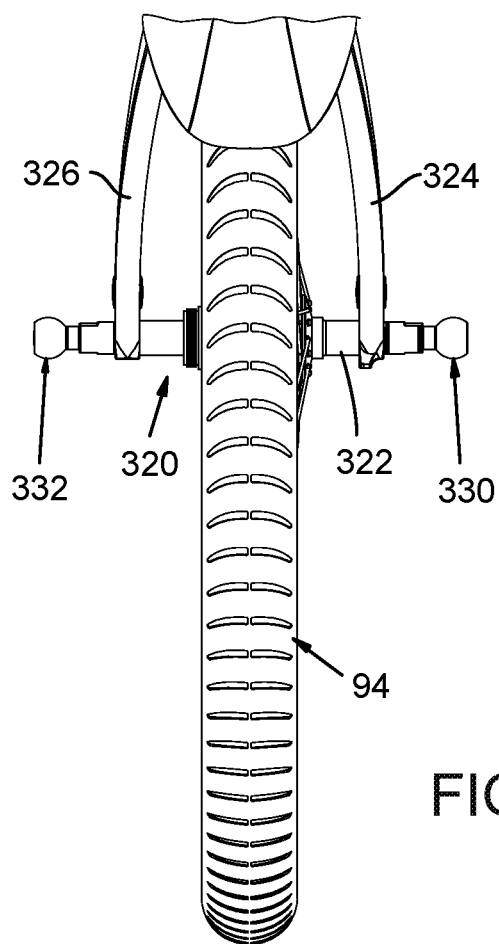
FIG. 8 is a rear view of the rear bicycle wheel illustrating a skewer with trailer coupling elements for coupling the one form of latch mechanism that can be included at distal end portions of the yoke arms.

In FIG. 8, a skewer 320 is shown with an axle or spindle assembly 322 for coupling the wheel 94 of a bicycle to rear forks 324, 326 of a bicycle frame. Attached to the opposed ends of the spindle assembly 322 are respective first and second couplers 330, 332 that project outwardly away from the forks 324, 326. These couplers desirably have latch coupler bearing surfaces that engage the latches 112, 116. Desirably the latch coupler bearing surfaces are arcuate, and more desirably spherical. These arcuate or spherical surfaces desirably engage coupler receiving portions of the latches 112, 116 as the trailer articulates relative to the bicycle.

Although alternative forms of skewer couplers can be used, desirably skewer couplers are used that allow relative pivoting of the yoke arms and thereby the trailer relative to the bicycle during use. It is particularly desirable that those portions of the couplers 330, 332 that engage the trailer latches as the trailer articulates to various positions are spherical, whereas other surface portions of the couplers 330, 332 can be of a different shape. The spherical coupling surfaces allow the latches to move in more than just a direction about the longitudinal axis of the skewer. Portions of the couplers that do not engage a trailer latch in this example do not need to be spherical. For example, the couplers 330, 332 in FIG. 8 can have flat ends in a plane perpendicular to the axis 333 of the skewer 320. As another example, a lower hemisphere or a quadrant of the couplers need not be spherical. In this example, the zero degree position is at the top of the coupler and the lower hemisphere from a 90 degree to a 180 degree position opposite to the zero degree position, or a lower quadrant (from 120 degrees to the 180 degree position on both sides of the coupler) need not be spherical. However, desirably, except for the ends or portions of the couplers facing forward and away from the forks, the couplers are spherical and/or are about spherical. Consequently, if the couplers are allowed to rotate about the longitudinal axis of the skewer, a spherical portion of the coupler will be positioned in engagement with a latch of the trailer regardless of the rotational orientation of the coupler about the skewer longitudinal axis. Desirably the couplers are coupled to the skewer such that the couplers can rotate about the skewer. The spherical surfaces accommodate various angles between the longitudinal axis of the skewer and the trailer yoke arms. Also, this angle can change during towing of the trailer. For example, as a bicycle crests a hill and starts downwardly, and before the trailer crests the hill, the couplers can rotate to facilitate a change of the angle between the tow arms and trailer to follow the terrain. In addition, as another example, if the bicycle or trailer hits a bump, the couplers cam rotate to facilitate a change in the angle between the yoke arms and bicycle to accommodate the bump. However, if a trailer is fully loaded and the trailer or bicycle hits a bump, the increased load on the couplers can interrupt the rotation of the couplers. However, the yoke arms can still pivot about the couplers to allow a change in the angle between the tow arms and the bicycle. The couplers 332 can have internal bearings rotatively coupling the couplers to supporting posts or projections. Alternatively, the couplers can comprise or consist of a reduce friction material such as a polymer with lubricity. Polyoxymethylene (POM) and polytetrafluoroethylene (PTFE) are examples of such reduced friction materials.

With reference to FIG. 9, one form of skewer assembly 320 comprises a spindle or shaft 340. Respective collars 342, 344 are coupled to the shaft. For example, the collars can comprise externally threaded posts that are threaded into threaded bores in the respective ends of the shaft 340. This can be seen with respect to collar 344, which has a projection or post 350 with a threaded exterior surface for threading into a threaded opening in the end 352 of the shaft 340. The collar 342 is shown in FIG. 9 threaded into the end 354 of the shaft 340. The illustrated collars 342, 344 have outwardly extending projections or posts 356, 358 that receive and pivotally support the latch couplers 330, 332 (not shown if FIG. 9); such that, in this example, the shaft 340 can pivot relative to the couplers 330, 332. Alternatively, the couplers 330, 332 can be threadedly connected to the respective posts 356, 358. For example, the collars can have internally threaded bores with the shaft having externally threaded ends threadedly received by the collars (see for example the right hand end of the shaft 362 shown in FIG. 10). Shoulder screws or bolts and/or other fasteners can be utilized to hold the respective spherical couplers 330, 332 onto the ends of the posts 356, 358. In this example, the posts 356, 358 have an internally threaded opening for receiving fasteners that hold the spherical couplers in place. In the embodiment of FIG. 9A, elements in common with those of FIG. 9 have been given the same number. In the FIG. 9A example, the coupler 344 has internal threads for threadedly receiving the end 352a of the shaft 340. Alternatively, the collar 44 can be press fit or otherwise coupled to the end of the shaft 340. The posts 356a and 358a in FIG. 9A are longer than the posts 356 and 358 in FIG. 9 as they extend through the respective couplers 330, 332 and each have a respective annular snap ring receiving slot 337, 339 at an end portion thereof. A snap ring 341 is positioned in the slot 337 and a snap ring 343 is positioned into slot 339 to hold the couplers on the skewer assemblies in this example.

In addition, a quick release cam can be included in the spindle or skewer assembly, such as intermediate to collar 342 and the spherical coupler 330.

FIG. 10 illustrates an exemplary alternative form of coupler assembly in greater detail. In the embodiment of FIG. 10, couplers 330, 332 are shown with internal axially extending openings, axially being in the direction of longitudinal axis 360 through the skewer assembly. The illustrated assembly comprises a skewer shaft 362 having a first end 364 and a second end 366. The first end 364 comprises an enlarged cylindrical head 368 having an opening 370 extending through the head in a direction perpendicular to the axis 360. The end 366 of the skewer shaft 362 is threaded. A collar 372 has an opening 374 that is internally threaded so that the collar 372 can be threaded onto end 366 of the shaft 362. The collar 372 comprises a tension adjustment nut that operates to respectively increase and decrease the distance between an interior surface 375 of the collar 372 and an interior surface 395 of a cam housing 403; by decreasing this distance, greater pressure is applied to the wheel receiving bicycle forks and by increasing this distance, lesser pressure is applied to the forks, to, for example, permit removal and/or reinstallation of the bicycle wheel onto the forks.

The collar 372 comprises a post 377 that projects outwardly and axially away from the shaft 362. The post 377 in this example has an internally threaded opening 378. The post 377 has an exterior surface that is desirably smooth. A spherical coupler 332 has an internal opening 380 extending axially through the coupler. The coupler 332 is positioned on the post 377 and is pivotal relative to the post. The coupler 332 can have an internal bearing that surrounds the opening 380 and can, for example, be press fit into the coupler 332. If included, such a bearing facilitates relative pivoting movement of the coupler. In addition, a washer, such as of a polymer, such as PTFE, POM or other friction reducing material, can be positioned between the exterior surface 379 of the collar 372 and the adjacent interior end surface of the spherical coupler. A washer 382 is positioned at the exterior side of the spherical coupler 332. A lock washer 384 can be included exteriorly of washer 382. A shoulder bolt or other fastener 386 is shown with a threaded shank 388. When assembled, the shank is inserted through the washer 384, the washer 382, and the spherical coupler 332 and into the opening 378 of the post 377 with the fastener 388 being rotated to tighten the fastener and join the components at this end of the skewer.

In the illustrated assembly, the head 368 on the end 364 of the shaft 362 opposite to end 366 is inserted into a head receiving opening 393 that extends axially into the cam housing 390. An opening 403 extends through the cam housing in a direction perpendicular to the axis 360. A cam 396 with a cam lever 397 has a shank 394 with a threaded end 400. The shank is inserted through the opening 403 through the cam housing and through the opening 370 of shaft head 368; head 398 having been inserted into the head receiving opening 393. A stop 399 on the shank 397 limits the depth of insertion of the shank into the cam housing. A washer 402 is received by shank end portion 400 and a nut 404 is threaded onto end portion 400 to complete the cam assembly.

The cam housing in this example comprises an outwardly extending post 410 projecting axially and outwardly away from the head 368. The post 410 desirably has a smooth exterior cylindrical bearing surface and an internally threaded opening 412 extending axially into the post.

The spherical coupler 330 has an axially extending opening 414 there through. The coupler 330 can have an internal bearing, such as press fit therein, that receives the post 410 and that facilitates relative pivoting movement of the coupler 330 on the post 410. As explained in connection with coupler 332 and post 377, a washer, such as of friction reducing polymer or other material with PTFE) and POM being examples, can be positioned between the interior surface of coupler 330 and the exterior surface of the cam housing. A washer 416 and lock washer 418 are positioned on the post 410 at the exterior or outer side of the coupler 330. A fastener 420, such as a shoulder bolt, with an externally threaded post 422 is inserted through washers 418, 416, and through the opening 414 through coupler 330 and into the opening 412 of the cam housing. The shoulder bolt or other fastener 420 is tightened to complete the skewer assembly.

Desirably the fasteners 386, 420 (FIGS. 9 and 10) and 341, 343 (FIG. 9A) do not tightly engage the couplers 332, 334 so that the couplers can rotate on the respective posts (358, 356 FIG. 9, 358*a*, 356*a* FIG. 9A, and 377. 410 FIG. 10).

The cam 396 operates in a conventional manner to respectively increase and/or decrease the distance between the surfaces 375 and 393 to thereby respectively increase and/or decrease the pressure exerted by the skewer on the bicycle forks.

Figure 11:
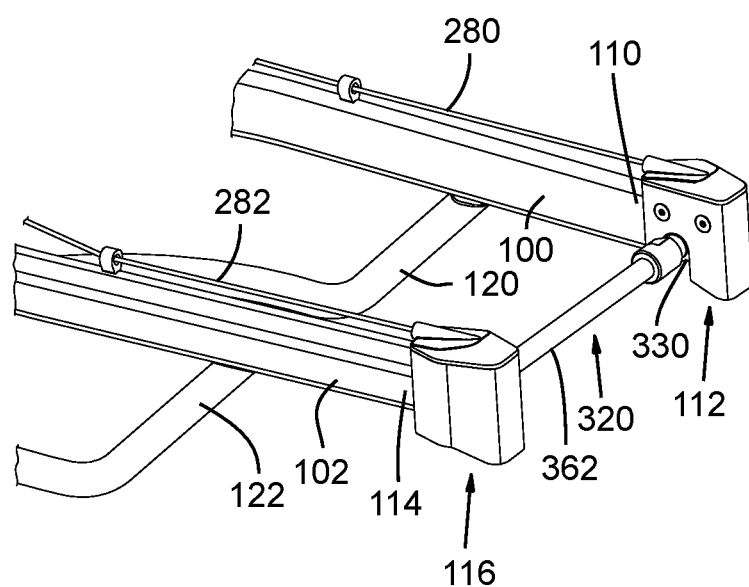
FIG. 11 is a perspective view of the yoke arms coupled to the skewer of FIG. 9 and with the bicycle omitted for convenience.

FIG. 11 illustrates the skewer assembly 320 of FIG. 9 coupled to the respective coupling elements or latches 112, 116 of the respective yoke arms 100, 102.

The coupling elements 112, 116 can be the same. Therefore, the coupling or latch 112 will be described below in connection with FIGS. 12A and 12B, it being understood that the coupling element or latch 116 can be the same (or a mirror image) and requires no further discussion.

Figure 12A:
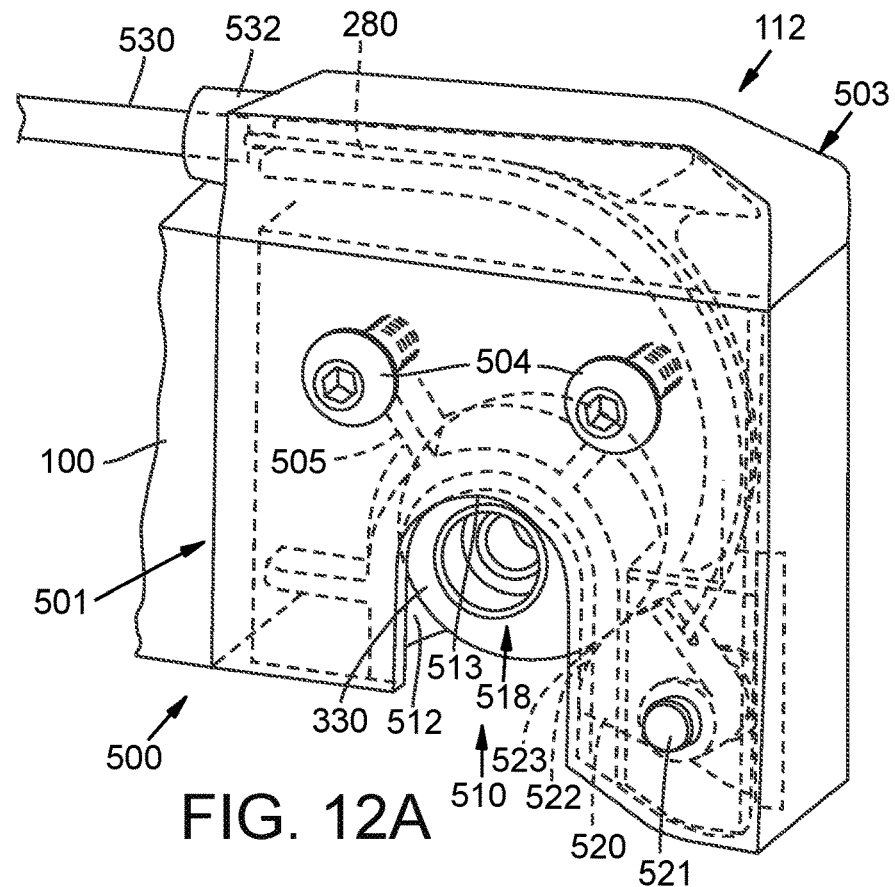
FIG. 12A is a perspective view of an exemplary latch assembly for coupling the distal end of one of the yoke arms to the skewer.
Figure 12B:
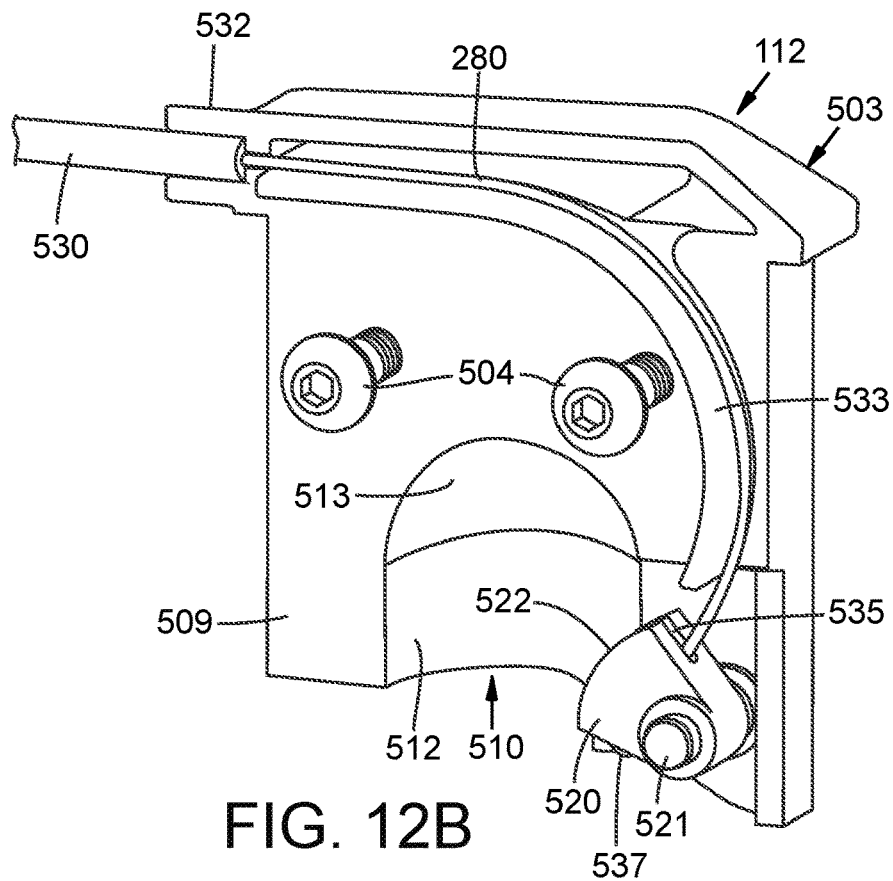
FIG. 12B is a sectional view of the latch assembly of FIG. 12A with a cover portion of the latch removed.

The illustrated coupling element or latch assembly 112 of FIGS. 12A and 12B comprises a housing 500 that can be molded or otherwise formed from a suitable polymer material and/or metal, such as, for example, polyethylene plastic or aluminum. The housing can comprise a first or front housing section 501 and a second or rear housing section 503 (an exemplary rear section 503 being shown in FIG. 12B). Fasteners, such as bolts 504 can be used to interconnect the housing sections. The housing 500 can have a hollow interior and can be open from the bottom. Reinforcing ribs 505 can be included in the housing, such as in housing section 501 bearing against the interior surface 509 (FIG. 12B) of housing section 503, to reinforce the housing (one such rib being assigned the number 505 in FIG. 12A.

The housing 500 can also comprise a socket, not shown in FIG. 12A, for receiving the distal end 110 of arm 100, to which the housing 500 is mounted. A slot 510, such as a skewer coupler receiving pocket, sized for receiving the coupler 330, is shown in FIG. 12A. A portion of the slot is desirably included in each of the housing sections, such as the rear portion of the slot 510 shown in housing section 503 in FIG. 12B. The slot 510 is bounded by a wall 512. An upper end portion 513 of the wall can be of a shape that matches or conforms to the shape of skewer engaging surface portions of the coupler 330, such as arcuate, and desirably a spherical shape in the case of a coupler with spherical skewer coupling surfaces. The wall portion 513 can define a spherical coupler engaging surface that is about one-half of a sphere or hemispherical. This is best understood from the portion of the wall 513 illustrated in FIG. 12B which shows one-half of an exemplary coupler engaging surface, the mirror image of which is included in an adjacent wall of housing section 501. The wall 513 can be lined with a friction reducing and noise dampening material if desired. Alternatively, the wall 513 can comprise a surface of an insert positioned at the upper end of the slot 510.

The slot 510 is sized such that latch 112 can move upwardly with the arm 100 and relative to the coupler 330 in the direction indicated by arrow 518 in FIG. 12A, when the latch is operated to release the coupler. A coupler latch member or coupler engaging stop 520 is shown fixedly mounted to a pivot pin 521. The pin 521 is coupled to the housing 500; such as to housing section 503 in the FIG. 12B example, and extends transversely across at least a portion of the interior of the housing. The stop is pivotal from latched to unlatched positions. The stop 520 includes a coupler engaging surface 522 that, in the latched positioned, is positioned partially in the slot 510 to block the upward movement of the arm 100 and latch 112 and thereby block decoupling the arm 100 from the coupler 330. As can be seen in FIG. 12A, a gap 523 can exist between the engaging surface 522 and adjacent portions of the coupler 330 in the latched state to provide additional freedom of movement of the arm 100 relative to the coupler 330 as the trailer is being towed. Typically, due to the weight of the trailer, when the trailer is coupled to the bicycle, bearing surfaces of the wall 513 of housing sections 501, 503 abut and engage the coupler 330. The stop 520 can also be pivoted to an unlatched position in which the stop does not obstruct the slot 510 so as to allow removal of the arm and latch from engagement with the coupler. The pin and stop 520 can be biased, such as by a coil spring, to one of the latched and unlatched positions and desirably to the latched position.

A cable 280, having a free end portion coupled to the stop 520, can be employed to pivot the stop between latched and unlatched states. In FIGS. 12A and 12B, the cable 280 can be in a sheath 530 with the end of the sheath coupled by a connector 532 to the housing 500. The housing sections 501, 503 can define a cable guide path or passageway in which the cable can be positioned for sliding movement relative to the housing sections. In FIG. 12B, an end portion of the cable 280 is shown inserted into a slot 535 that is centrally positioned in the stop, such as perpendicular to the pivot axis of pin 251. An enlarged head or stop 537 of a cross sectional dimension greater than the width of the slot 535, retains the cable in the slot after it has been inserted therein, while permitting removal of the cable if desired. The cable can be clamped or mounted to the stop, or wound around the pin 521, as alternatives. Consequently, when the cable 280 is pulled upwardly in FIGS. 12A and 12B, the stop 520 is pivoted upwardly (in a clockwise direction relative to arm 100 in FIGS. 12A and 12B) to an unlatched or open position in which stop 520 is sufficiently out of the slot 510 so as to no longer prevent removal of the latch from the skewer coupler 330. Conversely, when the cable moves downwardly, the stop 520 is pivoted downwardly (in a counter clockwise direction relative to arm 100) to a latched or closed position preventing separation of the latch from the skewer coupler. It should be understood that the direction of motion between the latched and unlatched positions, and direction of movement of the cables to move the latches between open and closed positions, depends upon where the stop is positioned in the housing. For example, the stop can be located and controlled to pivot upwardly to a latched position and downwardly to an unlatched position. An actuator comprising the cables 280, 282, if a cable actuation is utilized, can also comprise a common actuator mechanism so that the cables are simultaneously pulled and released to thereby operate the latches 112, 116 together as explained below. Alternatively, and less desirably, a separate mechanism such as a respective lever coupled to each of the cables 280, 282 can be provided for each of the latches. An exemplary actuation mechanism is described below.

Figure 13:
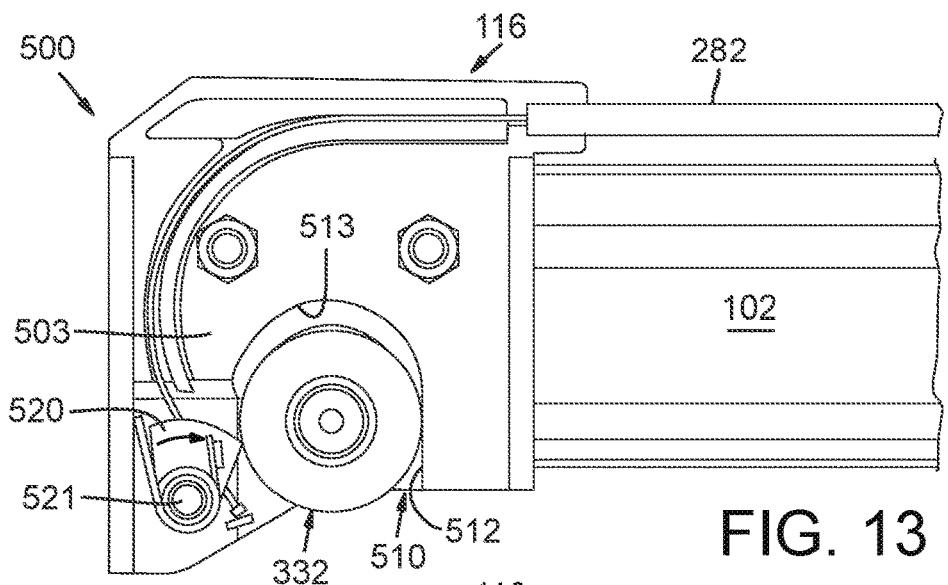
FIGS. 13-15 are broken away illustrations of the latch assembly in various latched and decoupled states.
Figure 14:
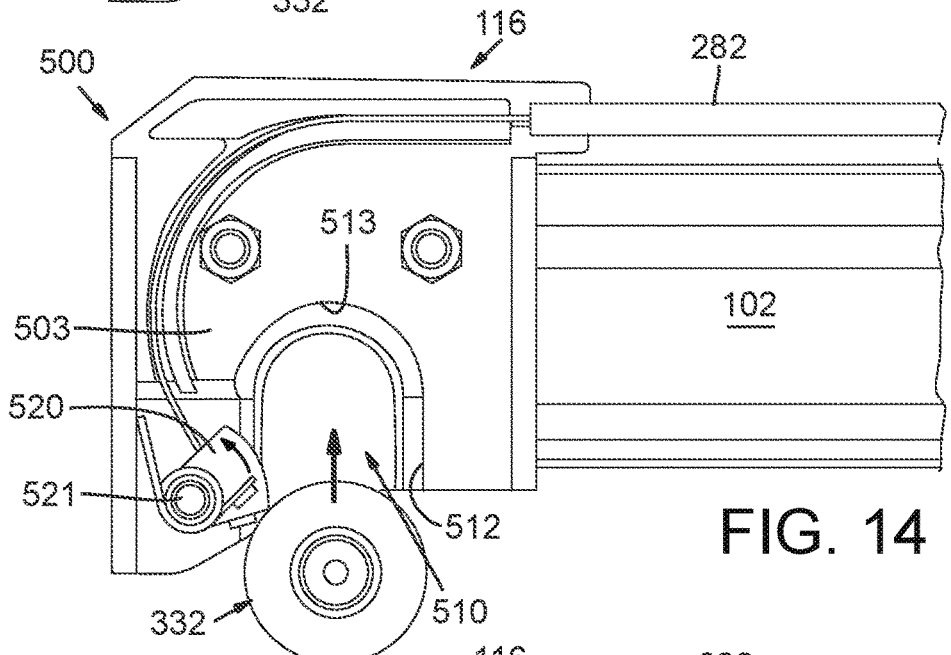
Figure 15:
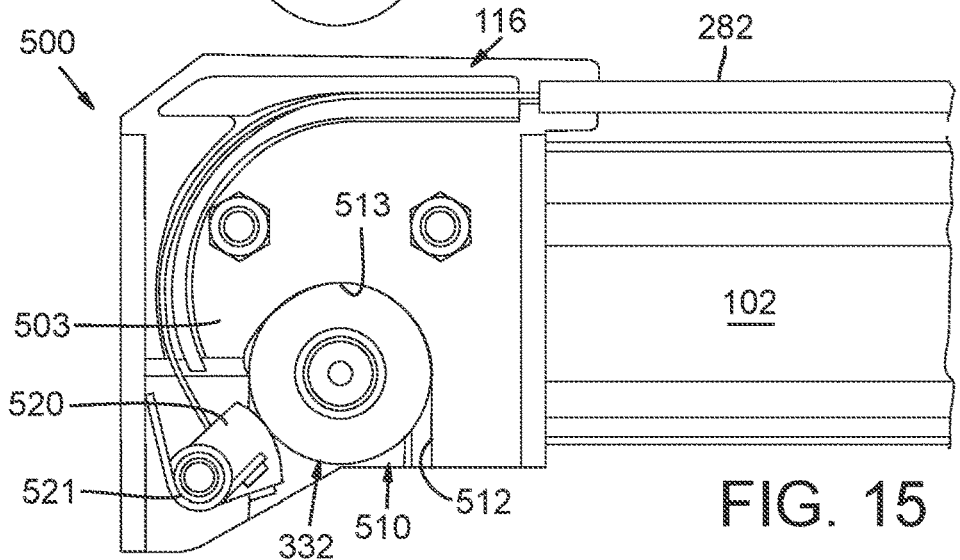

FIGS. 13 through 15 illustrate a sequence of operation of an exemplary latching assembly 116. Again, it being understood that assembly 112 operates in the same manner.

In FIG. 15, the latch assembly 116 is shown with the stop 520 in a latched position that captures the coupler 332 and retains trailer hitch arm 102 coupled to the coupler 332 and to a bicycle. In FIG. 13, the stop has been pivoted to an unlatched position that allows upward movement of the arm 102 to decouple the arm and trailer from the coupler 332. FIG. 14 shows the arm shifted to a position in the slot 550 after the arm has been moved to a position clear of the coupler 332. In FIG. 14, the stop 520 has returned to a position that it would be in to latch the arm 102 to the coupler 332 if the arm were in the position shown in FIG. 15. When the stop 520 is in the state shown in FIG. 14, in a desirable example, the latches can be lowered onto the skewer pivot elements and the arms can move to the FIG. 13 latched state without actuating the latches such as using a latch release as explained below. A biasing spring can then shift the stop to the position shown in FIG. 15. Alternatively, the latch can operate such that actuation of the latch is required to allow the latch to receive skewer elements and the coupling of the latch to the skewer.

Figure 16:
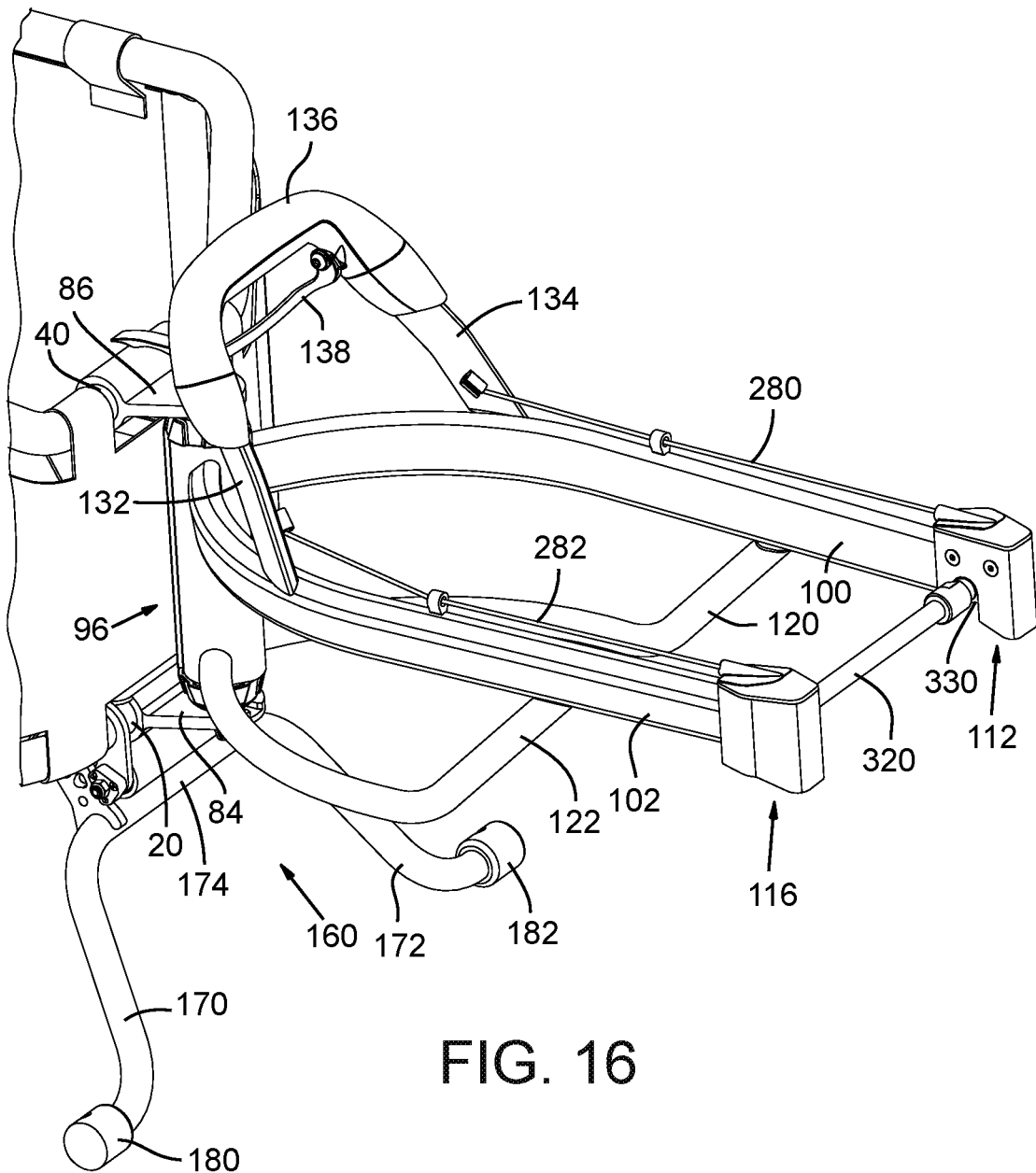
FIG. 16 is a perspective view of the front portion of the trailer with yoke arms coupled to a skewer.

FIG. 16 illustrates the trailer 10 in a position wherein the latching elements 112, 116 engage the respective spherical couplers (only coupler 330 being partially visible in FIG. 16) to couple the trailer to the skewer assembly 320 and thereby to the rear wheel axle of the bicycle. This FIG. 16 also shows an exemplary handle assembly 130 and actuator 138 in greater detail. Components forming an exemplary handle assembly and the operation thereof are described below in connection with FIGS. 17A-C and FIGS. 18A and 18B.

Figure 17A:
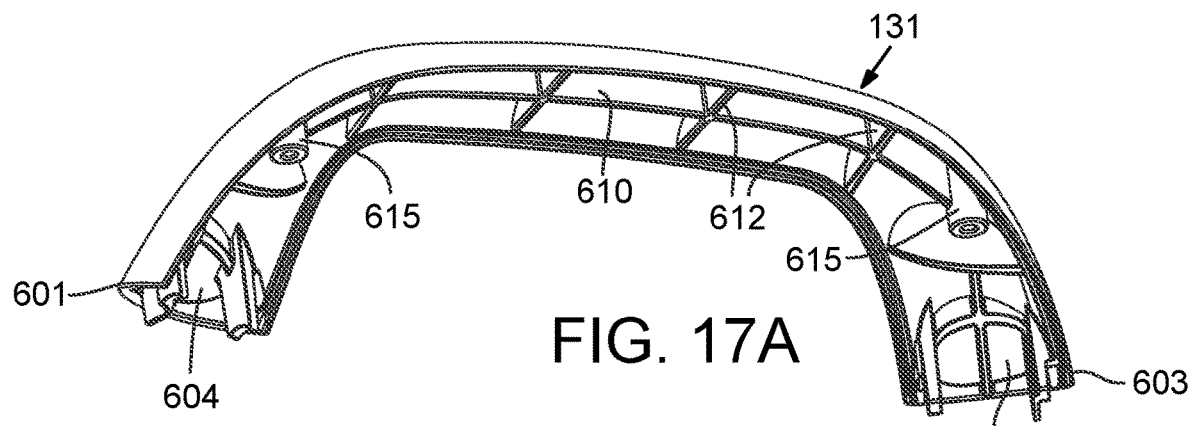
FIGS. 17A and 17B are perspective views of respective exemplary upper and lower handle sections that can be used in the bicycle trailer and that can accommodate a latch actuator for controlling the latch assemblies.
Figure 17B:
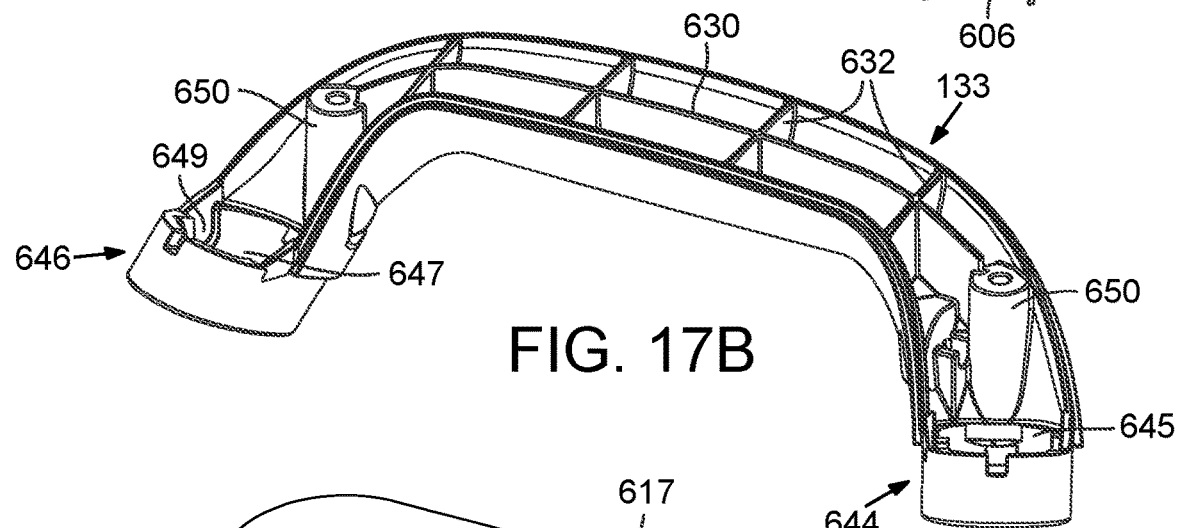
Figure 17C:
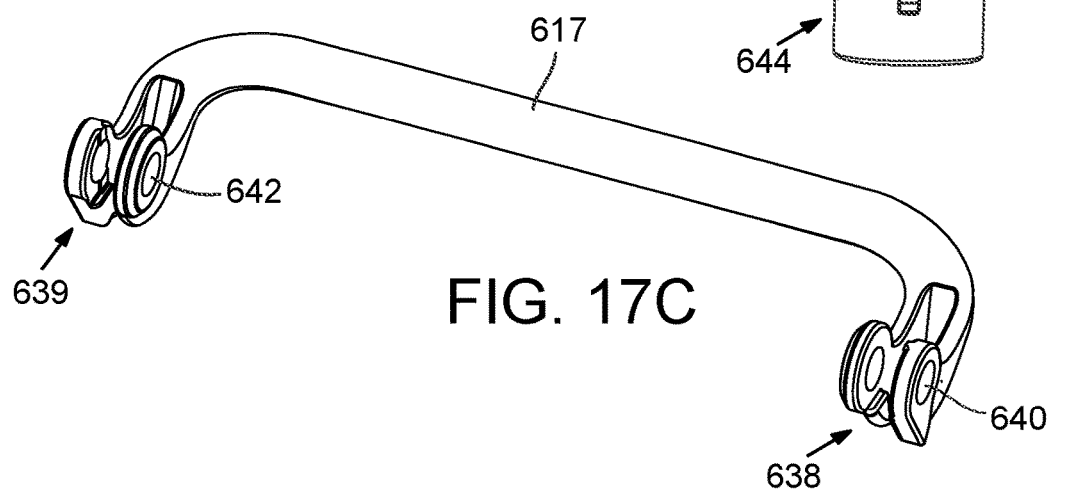
FIG. 17C is a perspective view of one form of a latch actuator comprising latch actuating cables and a cable mover coupled to the cables for moving the cables to control the operation of the latches.

FIGS. 17A and 17B illustrate a first or front upper handle member or component 131 and a second or rear lower handle component or member 133. The components 131, 133 together form a handle 136 mounted to the upper ends of the arms 100, 102. Handle member 131 (FIG. 17A) comprises a body with respective end portions 601, 603 that define respective openings 604, 606 therein. The handle section 131 can be hollow with a plurality of downwardly extending projections. In this example, there is one longitudinally and downwardly projecting reinforcing flange 610 extending along the body between the end portions 601, 603. There are also a plurality of transversely and downwardly extending reinforcing ribs or flanges, such as four such flanges 612 between the end portions 601, 603 of the body. In addition, actuator receiving pockets 604,606 are positioned respectively at ends 601 and 603 of the body.

The lower handle section 133 (FIG. 17B) can comprise a body which can also be hollow. The lower handle member 133 can comprise a longitudinally extending flange 630 and a plurality of transversely extending ribs 632. The body of the handle member 133 has first and second end portions 644, 646 that include respective actuator receiving pocket 645, 647. The actuator receiving pockets can have actuator receiving seats, one being indicated at 649 for pivotally receiving an end portion of an actuator lever, one end portion of the actuator lever being positioned in the pockets 604, 607 and the other end portion of the actuator being positioned in the pockets 606, 645 when the handle is assembled.

The illustrated lever actuator 138 comprises one form of a cable mover for moving the cables of the actuator to control the operation of the latches. The lever actuator 138 comprises a body 617 with respective end portions 638, 639 that are pivotally supported in the respective ends of the assembled handle elements 131, 133. An end of cable 280 (e.g. a second end portion of cable 280 spaced for the end portion of cable 280 that is coupled to its associated stop) is coupled to end portion 638 of the actuator and an end of cable 282 (e.g. a second end portion of cable 282 spaced from the end portion coupled to its associated stop) is coupled to end portion 639 of the actuator. Lifting upwardly on the actuator body (in FIG. 1) pivots the lever and pulls the second end portions of cables 280, 282 in a first direction and also moves the opposite ends of the cables to thereby move the respective stops 520; in this example from a closed position to an open or unlatched position. Thus, in this example, the lever actuator simultaneously moves the stops of each of the latches to their respective open positions. Less desirably, a separate lever can be associated with each latch with the latches being operated independently of one another.

Alternatively, instead of a lever actuator 138, the cable mover of the actuator can comprise an actuating button and/or a bar slidable into and out of the housing and coupled to the second end portions of the cables to move the cables and operate the stops of the latches. Other cable movers or actuation mechanisms can alternatively be used, such as a rotary dial or pull cord. A separate cable mover or actuator mechanism can be provided for each cable. However, more desirably a common cable mover or actuator mechanism (coupled by cables to each of the latches) is used to simultaneously move the latches to open and closed positions.

Figure 17D:
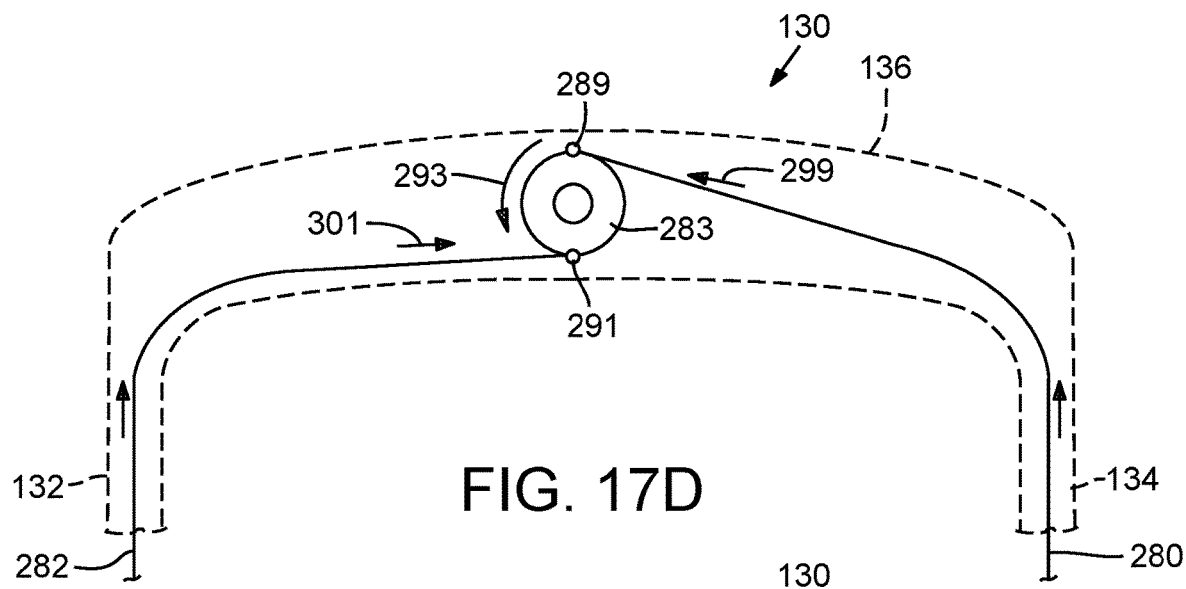
FIGS. 17D-17I schematically illustrate alternative forms of cable movers.
Figure 17E:
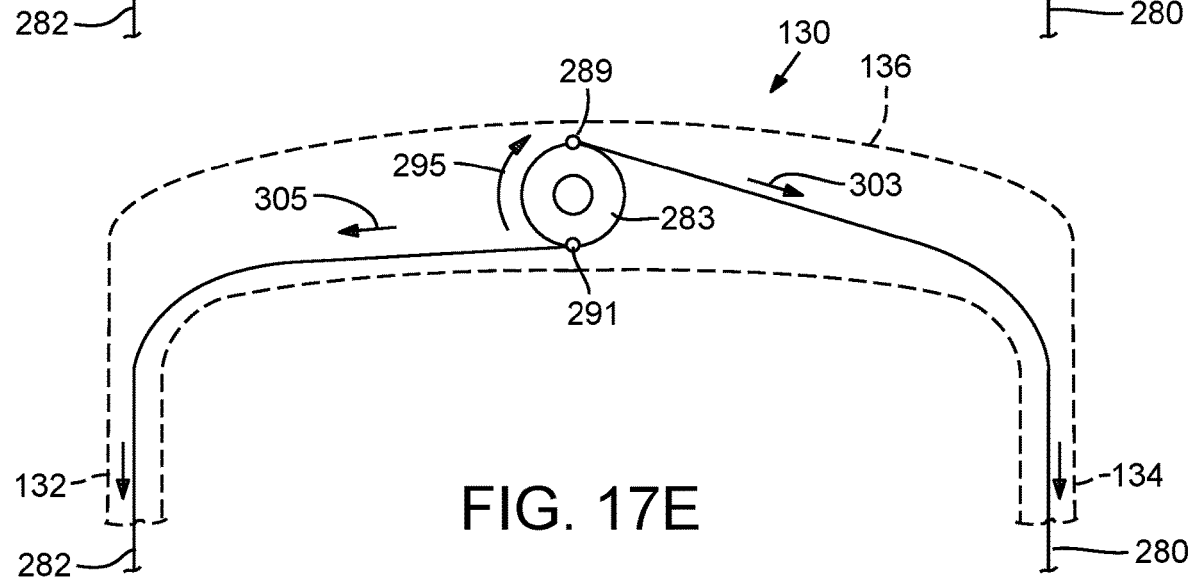
Figure 17F:
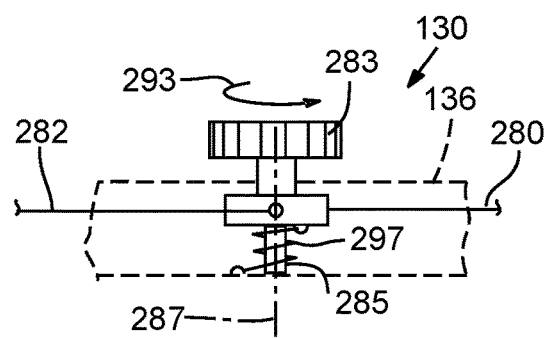

FIGS. 17D-17F illustrates on alternative form of cable mover. In FIG. 17D a dial 283 if pivotally coupled to the handle 136 by a pivot pin 285 for pivoting about a pivot axis 287. The second end portions of the cables 280, 282 are respectively coupled to the dial 283, interiorly of the handle at diametrically opposed locations 289, 291 in this example. Pivoting dial 283 counter clockwise in FIG. 17D pulls the respective second end portions of the cables 280, 282 (in the directions of arrows 299, 301) and moves the stops of the associated latches simultaneously to their open positions. Pivoting the dial 283 in a clockwise direction as indicated by arrow 295 in FIG. 17E moves the cables in respective directions 303, 305 and moves the stops of the associated latches to their closed position. A spring 297 (FIG. 17F) coupled to the handle 136 and dial 283 can be used to move the dial 283 clockwise when the dial is released to bias the stops and latches to their closed positions. In this example, the cables 280, 282 can be a continuous cable wrapped around an internal portion of the dial and fastened to the dial. Less desirably, a separate dial can be used for actuating each latch.

Figure 17G:
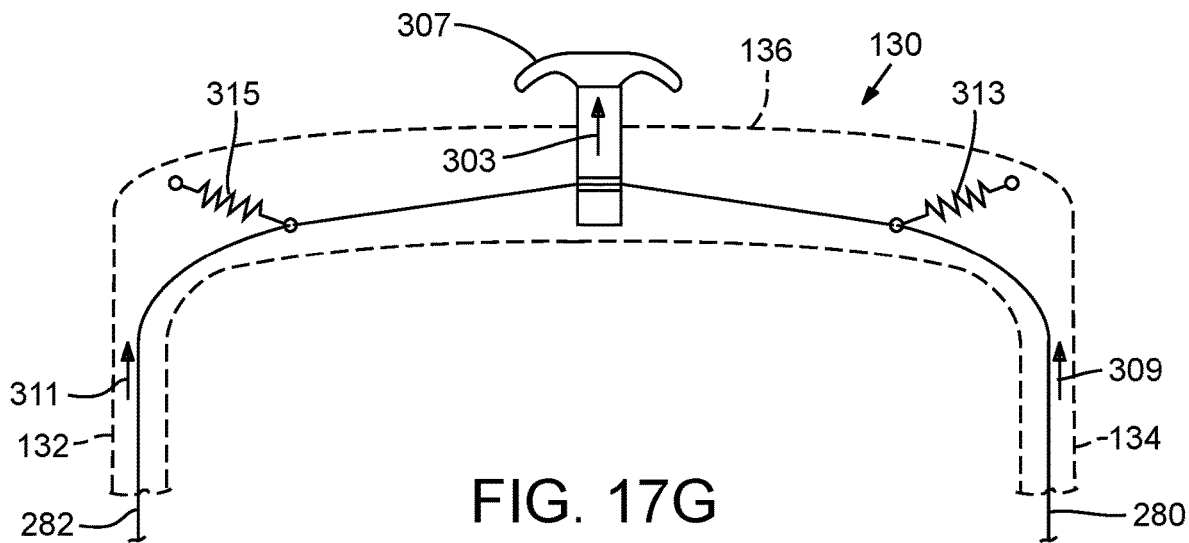

FIG. 17G illustrates a cable mover in the form a pull cord or pull cable mechanism. Respective second end portions of the cable extend outwardly from the handle 136 and are joined to a pull handle 307. Pulling on the pull handle in the direction of arrow 303 moves the respective second end portions of cables 280, 282 in the respective directions 309, 311 and moves the stops 520 and latches to their open positions. A spring 313 coupled between handle 136 and the second end portion of cable 280 can be used to bias the cable and pull handle 307 in a direction opposite to direction 309 to thereby bias the associated stop 520 and latch 112 to its closed position. Similarly, a spring 315 coupled between handle 136 and the second end portion of cable 282 can be used to bias the cable and pull handle 307 in a direction opposite to direction 311 to thereby bias the associated stop 520 and latch 116 to its closed position. In this example, the pull handle simultaneously moves the latches to their open positions. Less desirably, a separate pull handle can be used for each of the cables and associated latches. The cable sections 280, 282 can be joined together (e.g. as a single cable) and pass through the pull handle 307.

Figure 17H:
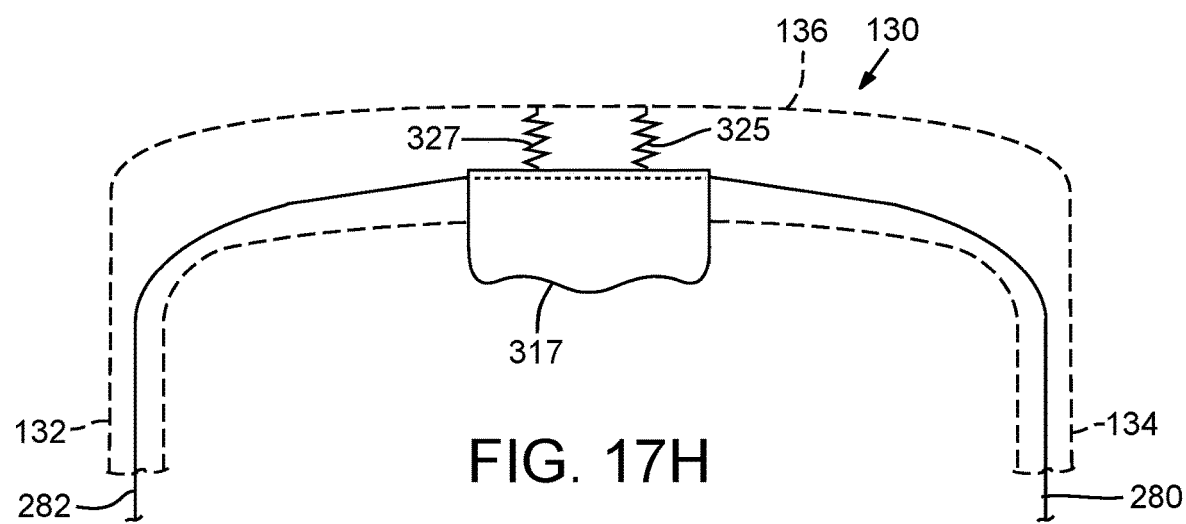
Figure 17I:
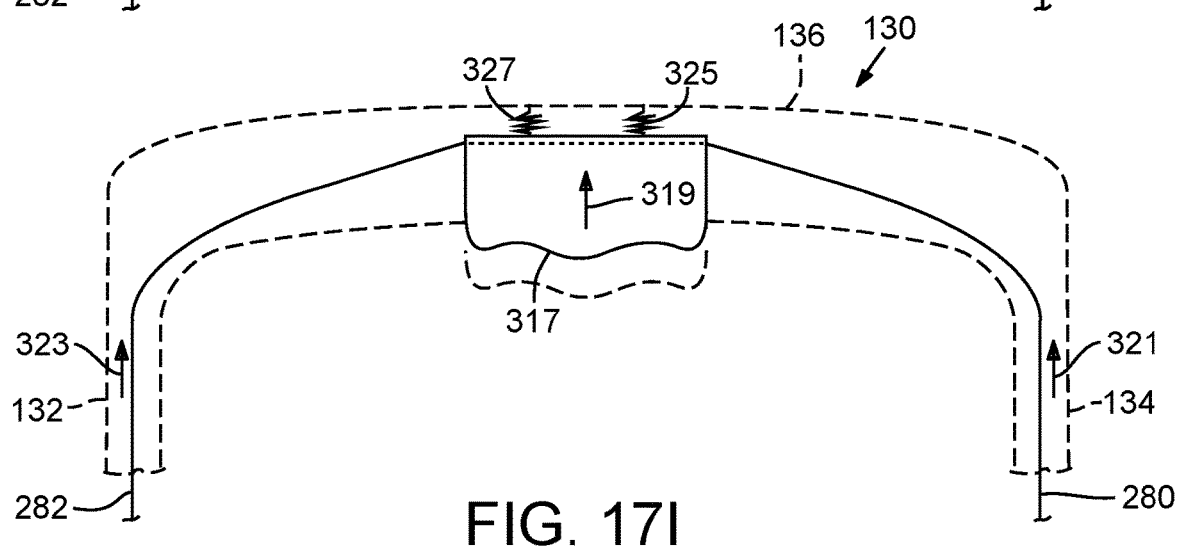

FIGS. 17H and 17I illustrate a push button or push bar type of cable mover. In this example, a push button or bar 317 is slidably coupled to handle 136 such that the bar can be depressed into the handle when pushed in the direction of arrow 319 in FIG. 17I. The second end portions of cables 280, 282 are coupled to the push bar or button (and can be one continuous cable) and move in the direction of arrows 321 and 323 when the push bar or button is depressed. This moves the respective stops and latches to simultaneously to their open positions. One or more springs, such as indicated at 325, 327 can be used to bias the push button or push bar to its undepressed position to move the cables 280, 282 in directions opposite to directions 321, 323 and bias the stops 520 and latches 112, 116 to their closed positions. Less desirably, a separate push bar or push button can be used for moving each of the cables independently of one another.

The illustrated handle sections 131, 133 can also have fastener receiving bosses (such as bosses 615 in FIG. 17A and 650 in FIG. 17B) that are aligned and that have distal ends that abut one another when the handles sections 131, 133 and actuator 138 are assembled into the handle 136 (FIG. 1). Fasteners, such as bolts or screws extending through bosses in the handle section 133 and threaded into bosses in the handle section 131 can be used to hold these elements together.

The actuator 138 can be biased, by springs not shown, to a skewer latching position as shown in FIGS. 1 and 15. In contrast, when the actuator 138 is in a depressed or actuated position in which the lever body 617 is pivoted toward the handle 136, resulting from squeezing the lever actuator and moving the lever actuator 138 toward handle portion 136, the cables 280, 282 are pulled toward the handle and pivot the stops 520 to their unlatched position or state. As explained above, when stops 520 are in their unlatched position, the trailer arms can be: (1) decoupled from the bicycle skewer couplers 230, 232 to remove the trailer; or (2) coupled to the bicycle skewer couplers 230, 232 to hitch the trailer to the bicycle. This can be accomplished by a user who uses one hand to pull the actuator 138 to simultaneously open latches 112, 116. The handle 136 (FIG. 1) allows the user to lift the unlatched trailer arms free from the bicycle or lower the arms onto the skewer couplers as the lever actuator 138 is depressed. Less desirably, a separate lever or actuator can be provided for each of the latches 112, 116.

FIGS. 18 through 23 illustrate exemplary yoke arm pivot structures for supporting the yoke arms 100, 102 such that the yoke arms can pivot about the upright axis of the pivot pin 98 within limits as allowed by the pivot structure. In this example, the arms 100, 102 are hinged for relative pivoting movement. Therefore, the distal ends 110, 114 of the arms 100, 102 can be spaced further apart or moved closer together to accommodate skewer assemblies 320 of different lengths and bicycles with different rear axles and tire sizes.

Figure 18:
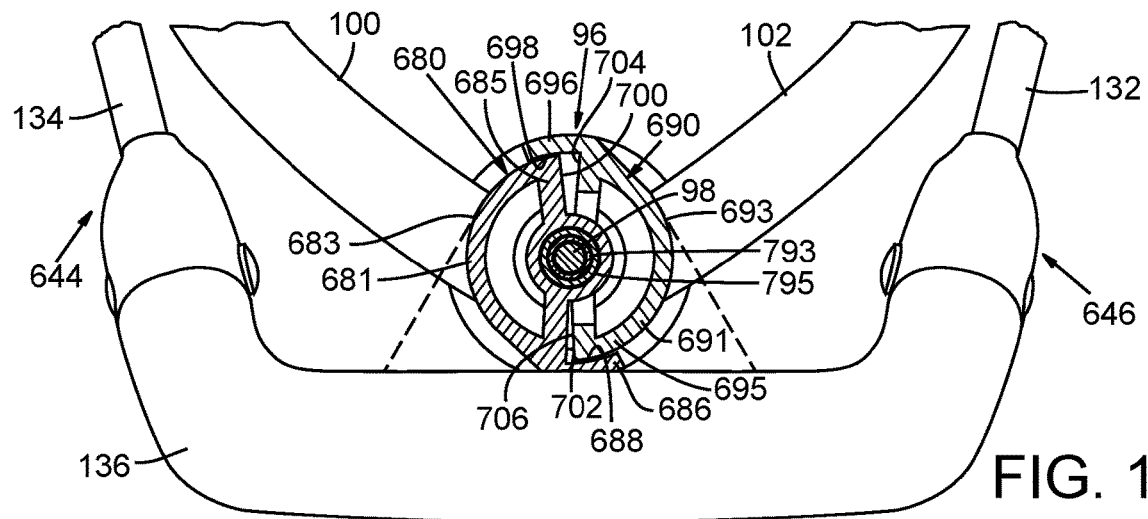
FIGS. 18-20 are broken away top views of one form of a hinge assembly that allows selective pivoting of the yoke arms toward and away from one another.

FIG. 18 illustrates the yoke arms 100, 102 pivoted apart a distance equal to the length of the illustrated skewer assembly 320 to allow the yoke arms to engage couplers (e.g. 330, 332) of the skewer assembly. In FIG. 18, the yoke arms 100, 102 are in an intermediate position between their most spread apart or divergent position and their closest spaced or most convergent position. Yoke arm 100 comprises a proximal end portion or first hinge member 680 and yoke arm 102 includes a proximal end portion or second hinge member 690. The hinge elements 680, 690 interfit with one another and are coupled to support flanges 84, 86 of the trailer by pin 98, in this example, such that the elements 680, 690 can pivot relative to one another about the axis of the pin 98. The column or collar 96 comprises the hinge elements 680, 690 in this example.

Hinge portion 680 comprises a first hinge body 681 coupled to the proximal end 683 of arm 100. The body 681 can comprise first guide portion 685 with a right cylindrical exterior surface and a projection flange 686 that can include a right cylindrical interior surface 688. Hinge portion 690 comprises a second hinge body 691 coupled to the proximal end 693 of arm 102. The body 691 can comprise a second guide portion 695 with right cylindrical exterior surface and a projection flange 696 that includes a right cylindrical interior surface 698. Hinge portion 680 includes third and fourth stop surfaces 700, 702. In addition, hinge portion 690 includes first and second stop surfaces 704 and 706. The stop surface 700 is adjacent to stop surface 704 and the stop surface 702 is adjacent to stop surface 706.

Figure 19:
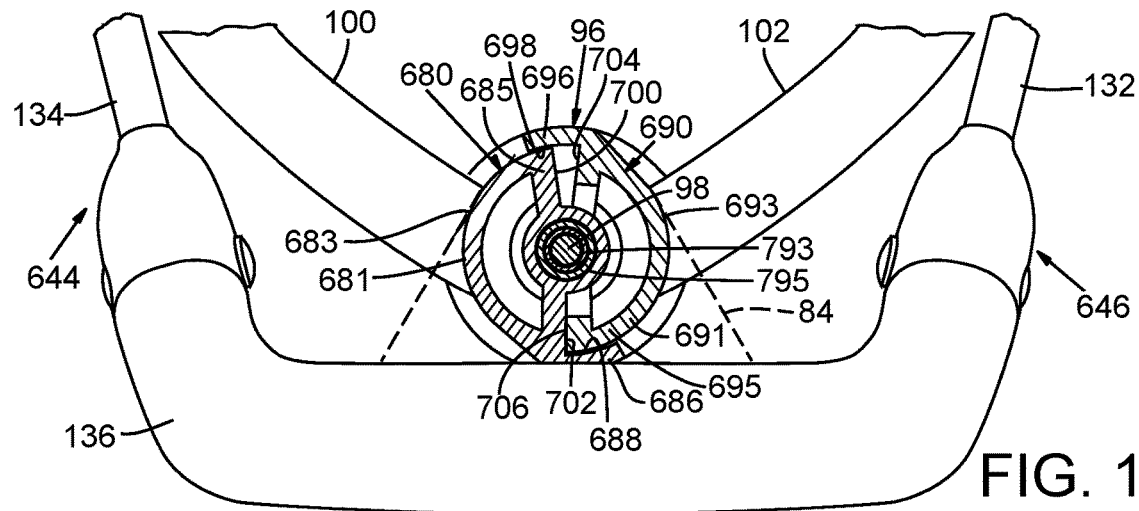
Figure 20:
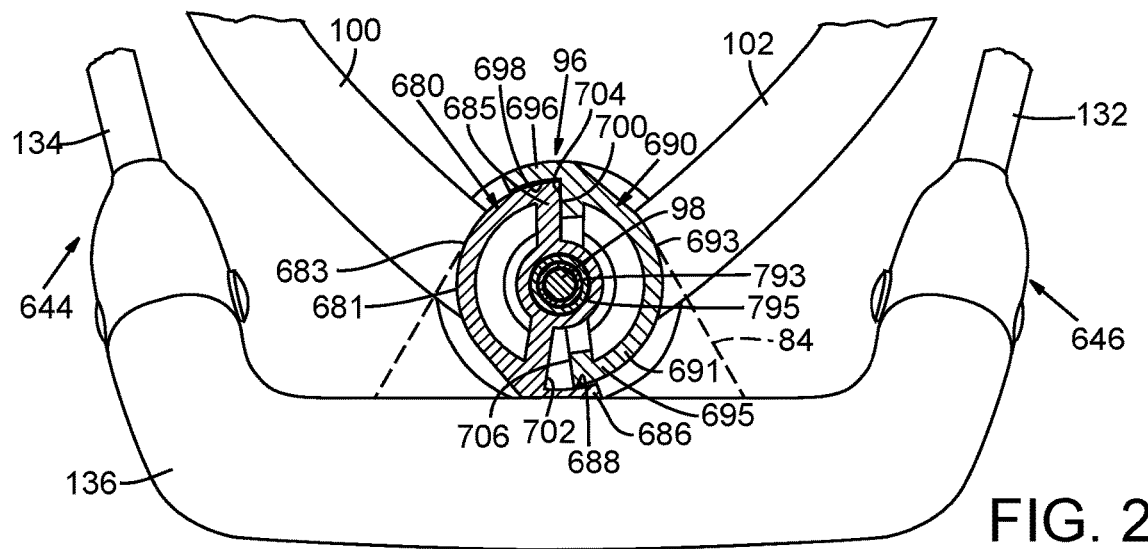

When arms 100, 102 are pivoted to converge toward one another about the axis of pin 98, the gap between surfaces 700 and 704 closes from the positions shown in FIGS. 18 and 19 until the stop surfaces 700, 704 abut one another as shown in FIG. 22. When they abut, the stops 700, 704 limit the extent to which the distal ends 110, 114 of arms 100, 102 can be pivoted toward one another. Conversely, when the arms 100 and 102 are pivoted in a direction to cause the distal ends 110, 114 to diverge or be spread further apart, that is pivoted about the axis of pin 98 away from one another, the gap between stop surfaces 702 and 706 closes. The distal ends can be spread apart in this example until the stop surfaces 702, 706 abut one another as shown in FIG. 19 and limit further divergence of the distal ends 110, 114 of the arms 100, 102. Therefore, with this construction the distal ends of the arms can readily be spaced a proper and variable distance apart, within the limits established by the stops 700,704 and 702, 706, for coupling to bicycles with skewers of different lengths.

These stops are desirable, but optional as the arms 100, 102 can be allowed to converge and diverge until the distal ends 110, 114 of the arms touch to limit further convergence and until other structures of the trailer are engaged to limit further diverging of the arms.

In addition, a mechanism can be provided to retain the yoke arms in a position to which they have been adjusted, such that once adjusted for a particular bicycle, no pivoting readjustment is needed when the bicycle trailer is again used on the same bicycle. For example, set screws can be used. Also, fasteners, such as a bolt can be used, for example between the two yoke arms adjacent to the hinge assembly, to hold the yoke arms in a position to which they have been adjusted.

As shown in FIGS. 18-20 and 21B, the flange 686 of hinge portion 680 can be an arcuate flange that can extend outwardly from the outer end of the stop forming surface 702 with its right cylindrical interior surface 688 positioned to overlap the stop surface 706 and the right cylindrical exterior surface of the second guide portion 695 of the body 691 of hinge portion 690. As is also shown in these FIGS. 18-20 and 21A, the flange 696 of hinge portion 690 can be an arcuate flange that can extend outwardly from the outer end of the stop forming surface 704 with its right cylindrical interior surface 698 positioned to overlap the stop surface 700 and the exterior right cylindrical surface of the first guide portion 685 of the body 681 of hinge portion 680. The interior surface 688 of flange 686 can slide adjacent to or abutting the exterior surface of body portion 695 and the interior surface 698 of flange 696 can slide adjacent to or against the exterior surface of body portion 685 to guide the pivoting of the hinge elements and shield the stop surfaces from exposure where they could otherwise can pinch or accumulate debris.

As can be seen in FIGS. 21A and 21B, the column 96 can be formed of interfitting right and left pivoting yoke collar portions or hinge elements 680, 690. The right side hinge portion 690 coupled to arm 102 is shown in FIG. 21A. The left side hinge portion 680 coupled to arm 100 is shown in FIG. 21B.

Referring to FIG. 21A, the exemplary hinge portion 690 comprises a plurality of rings 724, 726, 728 and 730 with respective pin receiving openings aligned along an axis 732 through the rings. The rings are spaced apart by respective ring receiving gaps 734, 736 and 738 and with an upper ring receiving gap 739 above the ring 724. The rings 724-730 are supported by inwardly projecting portions of the respective stops 704, 706. With reference to FIG. 21B, the exemplary hinge portion 680 comprises a plurality of rings 740, 742, 744 and 746 with respective pin receiving openings aligned along an axis 733 through the rings. The rings are spaced apart by respective ring receiving gaps 748, 750 and 752 and with a lower ring receiving gap 754 positioned below the ring 746. The rings 740-746 are supported by inwardly projecting portions of the respective stops 700, 702.

When the column 96 is assembled, the rings 724-730 of hinge member 690 are positioned in the respective ring receiving gaps 748-754 of hinge member 680 with the axis 732 aligned with the axis 733. In addition, the rings 740-746 are positioned in the respective gaps 734-739. The pin 96 can then be inserted through the interfitting rings 748, 750, 752 and 754 to hold the hinge portions 680, 690 together. More or fewer hinge rings can be used than the four rings per hinge portion shown in these FIGS. 21A and 21B.

FIGS. 22A and 22B illustrate a modified construction of the end portions 680, 690 and is designated 755 in FIGS. 22A and 22B. FIG. 22A illustrates one of the right or left hand hinge portions with the other being an inverted or bottom up version of FIG. 22A. In this modification, each hinge portion comprises a body 757 comprising first and second stops 759, 761. A portion 763 of the body 757 can have a right cylindrical exterior surface. An arcuate flange 765, with an interior right cylindrical surface portion 767, projects outwardly beyond the stop 759. The stop 759 functions like the stops 704, 706 in the above embodiment and the stop 761 functions like the stops 700, 702 in the above embodiment. The interior of body 757 comprises, in this example, a cavity 777, which can be semi-circular in cross section. The cavity can have other cross sectional configurations. In this embodiment, the rings comprise individual ring segments, 768, 769 and 770 such as shown in FIGS. 22A and 22B, each with a ring body 771 sized to fit within the cavity 777 and a ring portion 773 projecting outwardly between the stops 759, 761. The ring portions 773 are aligned such that a longitudinal pivot pin axis extends through the center of each of the ring portions 773 of the ring segments 768-770 and with gaps between the ring segments. The ring segments can be secured to the body 757, such as by adhesive, press fitting, or welding. The ring segments are positioned such that ring portions of the ring segments of a right hand hinge portion 755 fit within gaps between the ring portions of the ring segments of a left hand hinge portion 755. In the embodiment of FIG. 22A, the body 757 can be extruded and cut to length, molded or otherwise formed. The individual ring segments can be formed in the same manner. FIG. 22B is an end view of the structure of FIG. 22A looking from below.

Figure 23:
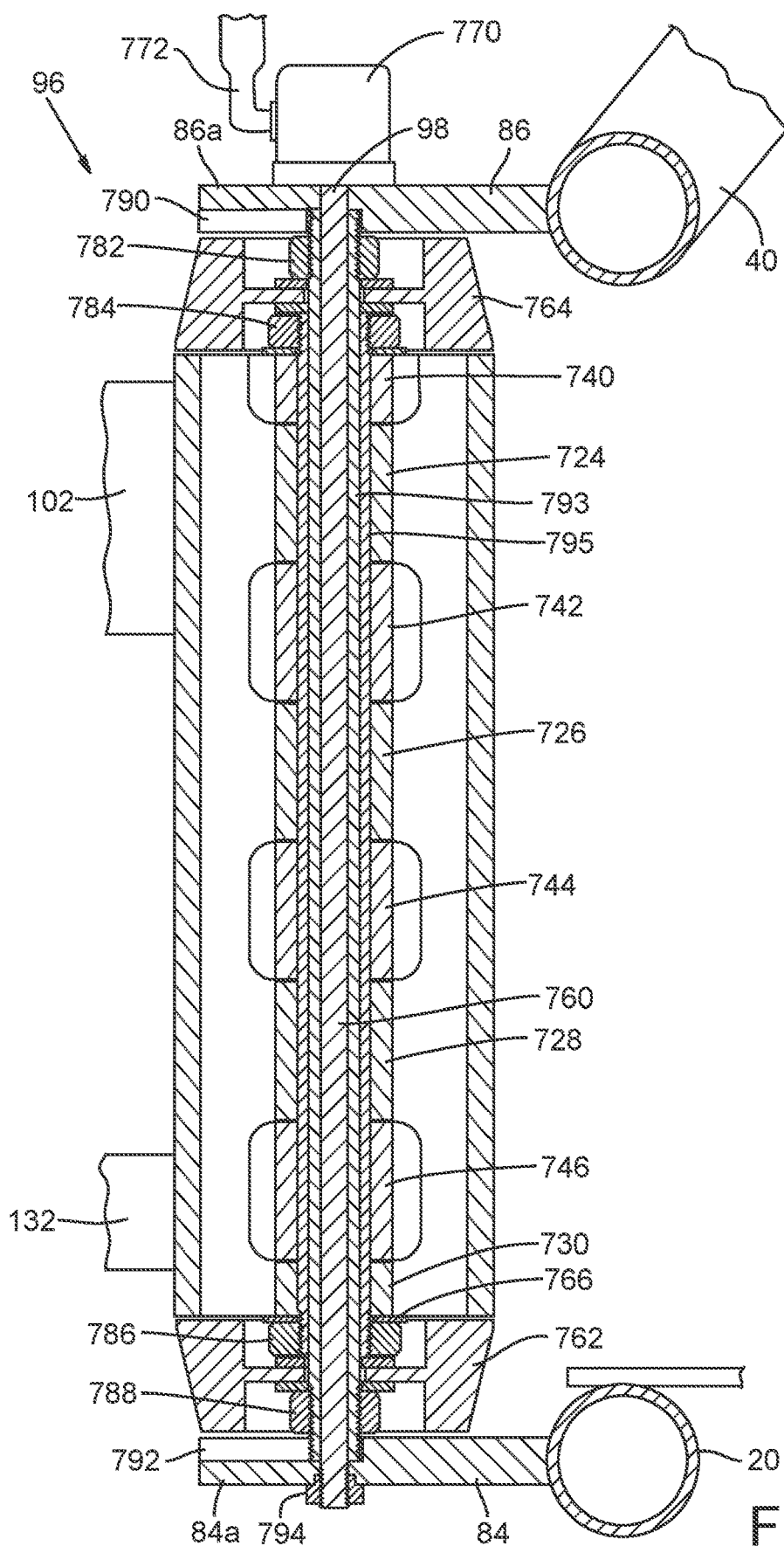
FIG. 23 is a sectional view of one form of hinge assembly for interconnecting the yoke arms.

FIG. 23 illustrates a vertical sectional view of an exemplary assembled column 96 that comprises a form of a pivot. In FIG. 23, the pin 98 is shown with a shaft portion 760 extending through the respective pin receiving rings. More specifically, in this example, the shaft portion 760 extends through an inner sleeve 793 and an outer sleeve 795. The Sleeve 795 extends through the pin receiving rings. Also, a lower support 762 is positioned between flange 84 and the lower end of the hinge forming elements of the column 96. An upper support 764 is positioned between flange 86 and the upper end of the hinge forming elements. The lower and upper supports or pivot end members 762, 764 can each have respective upper and lower recesses separated by a respective wall or shelf portion of the support. The outer sleeve 795 extends through the supports 762, 764 with respective upper and lower ends positioned in the upper recess of support 764 and in the lower recess of support 762. A nut 782 can be threaded onto the upper end of the sleeve 795 and positioned in the upper recess of support 764. A nut 788 can be threaded onto the lower end of the outer sleeve 795 and positioned in the lower recess of the support 762. The inner sleeve 793 extends into the lower recess of the support 764 and into the upper recess of the support 762. A nut 784 can be threaded onto the upper end of the sleeve 793 and positioned in the lower recess of support 764. A nut 786 can be threaded onto the lower end of the outer sleeve 795 and positioned in the lower recess of the support 762. Respective washers can be positioned between the nuts and wall portions of the upper and lower supports to provide bearing support. Alternatively, the upper and lower supports can be made of or comprise a polymer bearing material. Tightening one or both of the nuts 784, 786 decreases the distance between them and increases the force against the hinge elements to thereby increase the resistance of the yoke arms to pivoting movement. Conversely, loosening one or both of the nuts 784, 786 increases the distance between them and decreases the force against the hinge elements and thereby reduces the resistance of the yoke arms to pivoting movement. The resistance can be set at a desired level so that the yoke arms remain in a position to which they are pivoted until force is applied that exceeds the resistance. The outer sleeve 795 allows the yoke assembly to pivot relative the trailer frame while the yoke arms are maintained at their desired spread apart positions. The nuts 782, 788 hold the yoke assembly (the hinge elements and yoke arms 100, 102 with latch assemblies 112, 116, upper and lower supports and sleeves 793, 795) together when the pin 98 is removed. Therefore, the yoke assembly can be detached and removed from the trailer frame as an assembled unit. The yoke supporting flanges 84, 86 can be provided with respective slots 792, 790 that face one another and that can be open to an edge of the associated flange, such as to the front of the flange. The slot 790 receives the upper end of sleeve 795 of the yoke assembly and the slot 792 receives the lower end of the sleeve 795 of the yoke assembly. Once in place, the pin 98 can be inserted through the inner sleeve 793 and thereby through the yoke assembly to retain the yoke assembly in place on the frame. Other connections besides threaded connections can be used to hold the sleeves in place. For example press fit connectors can be used instead of nuts. In addition, a bushing 766 can be positioned between the lower end of the rings and the upper end of the lower support 762. The pin can comprise a cam 770 operated by a cam lever 772. The lever 772 can be used to release the cam and rotate the pin to free the pin for removal from the hinge assembly (e.g. to unthread the pin 98 from a nut 794 coupling the pin to the support 84). When the pin 98 is lifted free of the hinge rings, the yoke assembly is disconnected or decoupled from the trailer frame and can be separated therefrom, such as, for example, for storage and transportation purposes.

Thus, the exemplary pivot comprises at least one sleeve inserted (e.g. one or both of the inner sleeve 793 and outer sleeve 795 and desirably at least both of the sleeves) through the interfitting hinge portions (e.g. 680, 690) through which a hinge pin 98 is inserted. Also, the hinge pin 98 is desirably removable such that, upon removal of the hinge pin, the first and second hinge portions 680, 690 and thereby the first and second yoke arms 100, 102 are detachable from the bicycle trailer frame. In addition, the at least one sleeve desirably retains the first and second hinge portions together in their interfitting positions when the first and second hinge portions and first and second yoke arms are separated from the trailer frame. The at least one sleeve can also desirably be removable to allow separation of the interfitting hinge portions and yoke arms. Also, desirably first and second hinge portions comprise stops positioned internally within the pivot to limit the extent to which the minimum and maximum distances between the second end portions of the first and second yoke arms. Also, in one exemplary construction, the frame comprises spaced apart upper and lower pivot supports, such as flanges 86, 84, projecting forwardly from respective upper and lower portions of the front frame portion. The at least one sleeve can comprise the inner sleeve 793, which defines a hinge pin receiving passageway extending longitudinally through the inner sleeve, and an outer sleeve 795, which defines a longitudinally extending sleeve receiving passageway. With reference to FIG. 23, the inner sleeve 793 is positioned within the outer sleeve. In addition, the outer sleeve 795 is inserted through the first and second hinge portions 680, 690 and retains the first and second hinge portions in their interfitting positions. Also, when coupled to the trailer by the hinge pin 98, the sleeves 793, 795 are desirably positioned between the upper and lower pivot supports 86, 84. In FIG. 23, the hinge pin 98 is inserted through the hinge pin receiving passageway of the inner sleeve 793 and is coupled to the upper and lower pivot supports 86, 84 to couple the interfitting hinge portions and thereby the first and second yoke arms to the front frame portion. The FIG. 23 exemplary pivot also comprises upper and lower end members 764, 762. In addition, the outer sleeve 795 extends through the upper and lower end members and is coupled to the end members to retain the end members, the first and second hinge portions and thereby the first and second yoke arms together as a yoke assembly. Wherein, when the hinge pin is inserted through the upper and lower pivot supports, the upper and lower end members, the first and second hinge portions and the inner sleeve, the yoke assembly is coupled to the front frame portion. Also, the yoke assembly is separable as a unit from the trailer frame upon removal of the hinge pin. Also, in the FIG. 23 embodiment, the upper and lower pivot 86, 84 include respective slots 790, 792 that face one another and that are sized to slidably receive respective upper and lower end portions of the outer sleeve 795.

Figure 24:
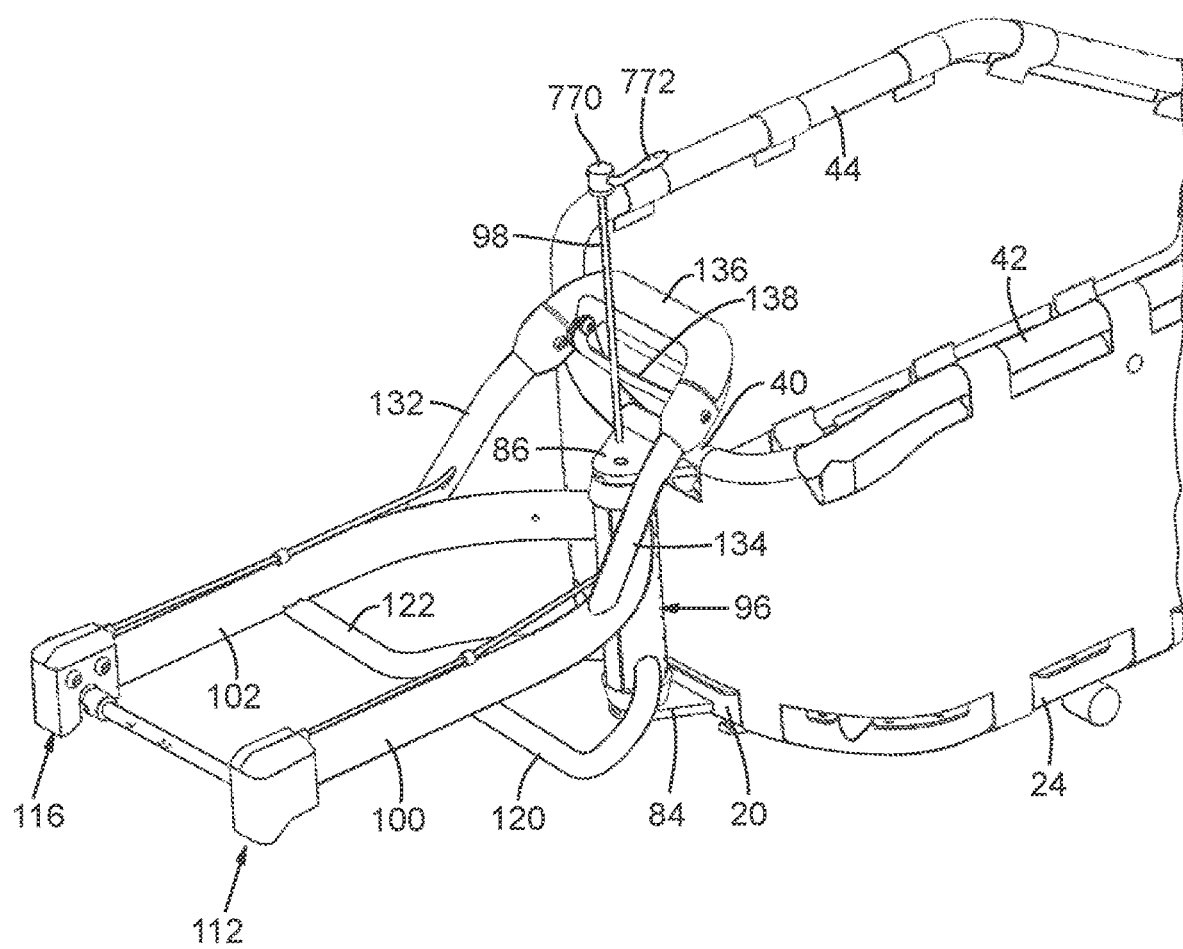
FIG. 24 is a perspective view of the bicycle trailer of FIG. 1 showing the removal of a hinge pin that allows decoupling of yoke arm, latching, handle and hinge portions of the trailer assembly from the rest of the bicycle trailer.

FIG. 24 illustrates the trailer 10 with the pin 98 removed; but prior to separating the yoke assembly from the trailer frame.

Figure 25:
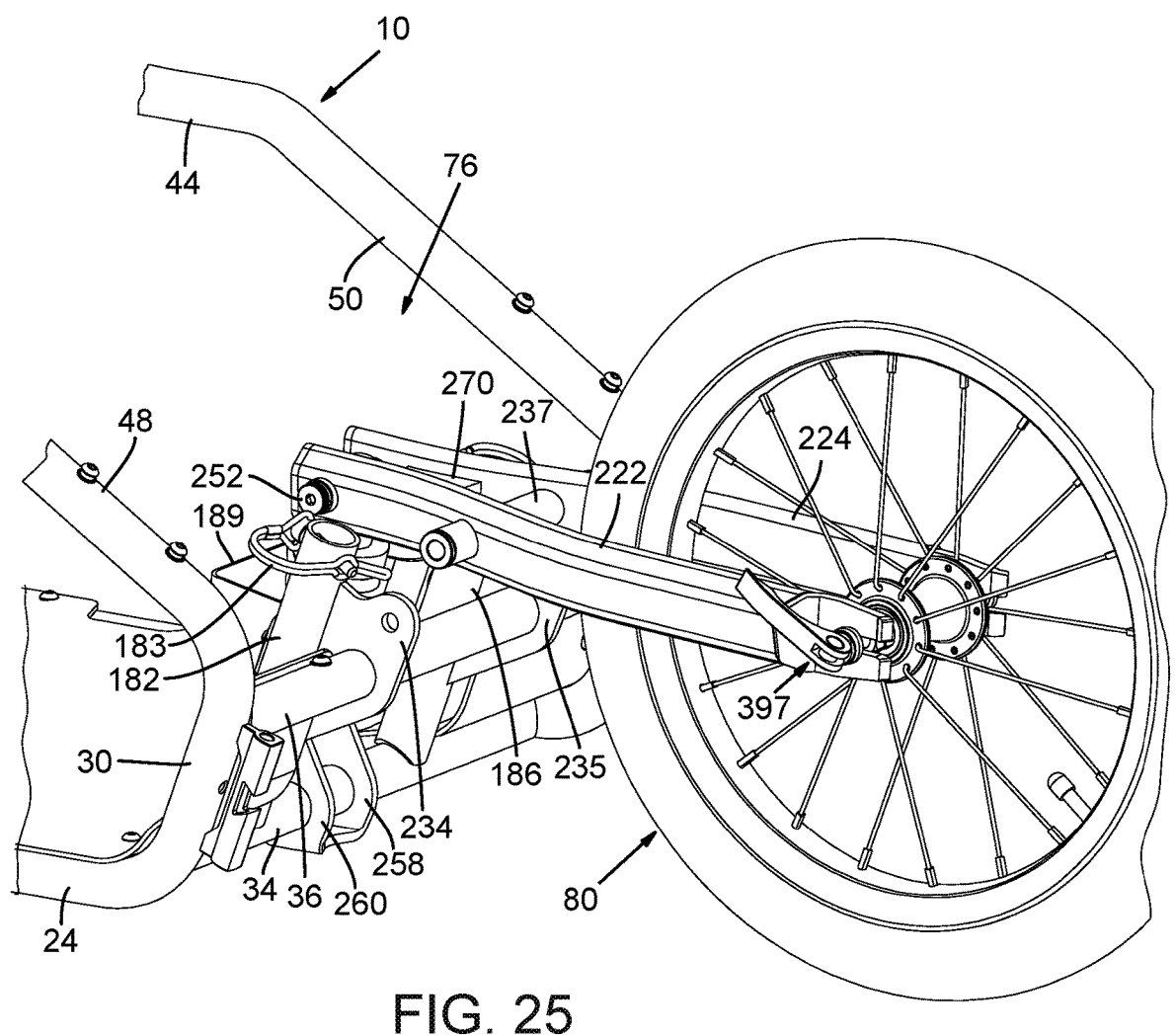
FIGS. 25 and 26 illustrate the operation of a wheel folding feature of the suspension of FIG. 3A.
Figure 26:
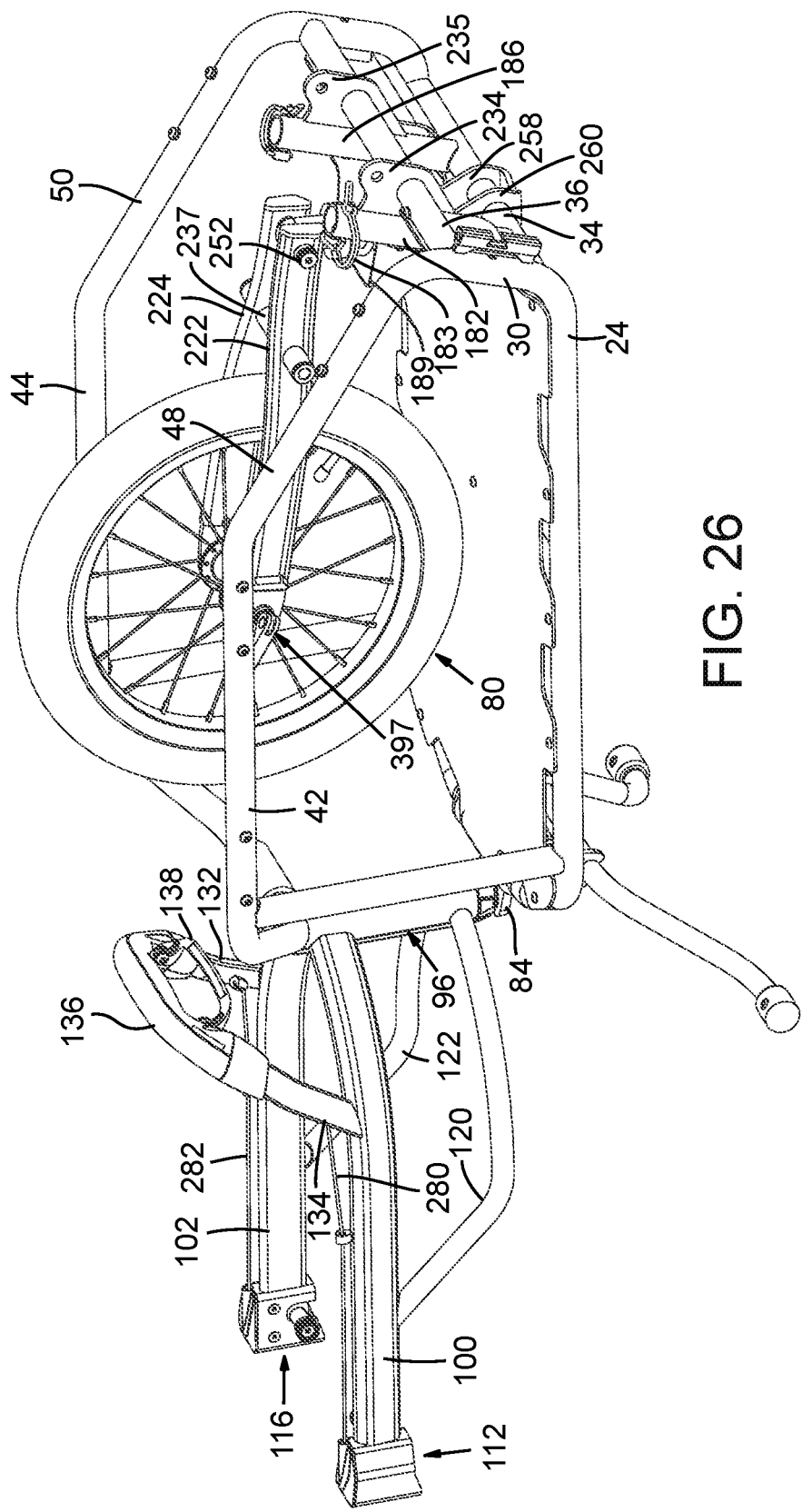

FIGS. 25 and 26 illustrate the folding of the rear wheel 80 (the rear wheel being coupled to the trailer by a quick release coupler 397 in this example) into the cargo area 76 of the trailer when the pin 232 and fender supporting assembly 180 are removed. When the yoke assembly comprising arms 100, 103 and the column 96 are also removed, as previously explained, and the kickstand is in a retracted position, the bicycle trailer is in a compact form for transport and storage.

Figure 27:
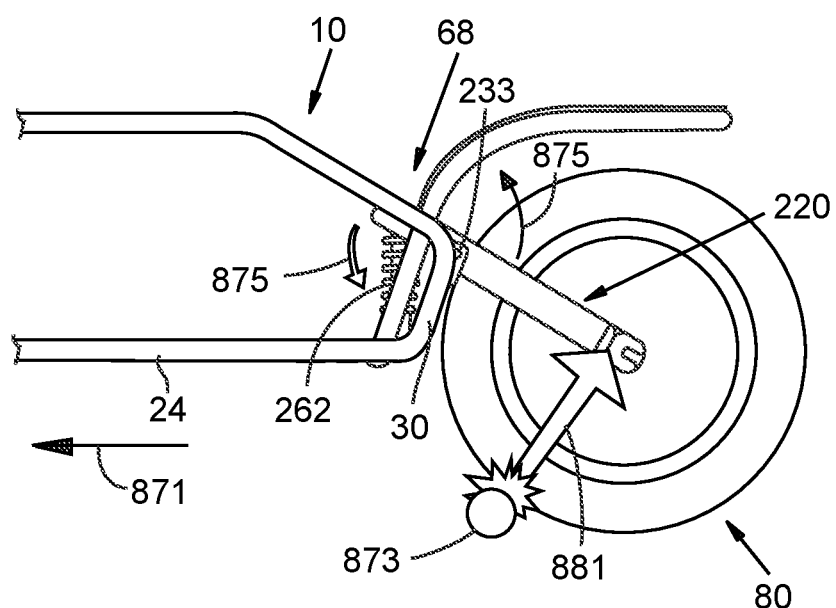
FIG. 27 schematically illustrates the operation of an exemplary trailer suspension included in the trailer of FIG. 1.

FIG. 27 schematically illustrates a desirable performance of the exemplary shock assembly 68 of the illustrated embodiment. Other shock assemblies can be used as alternatives. With reference to FIG. 27, rear wheel 80 of the trailer 10, being towed forwardly in the direction of arrow 871, is shown impacting a rock or other obstacle 873. The resulting impact force is transmitted substantially along the line of a vector 881 toward the wheel axle as shown in FIG. 30. In response, suspension arm 220 pivots, as indicated by arrow 875, about the pivot axis 233; the pivot axis being defined by pivot pin 232. This causes some of the impact force components to act rearwardly on the suspension instead of simply transmitting these forces upwardly.

Having illustrated and described the principles of our invention with reference to several embodiments, it should be understood that these principles encompass modifications of these embodiments in arrangement and detail. The illustrated embodiments are desirable examples and should not be taken as limiting the scope of the invention.

The invention claimed is:

1. A bicycle trailer comprising:
a bicycle trailer frame having a front frame portion and a rear frame portion;
a rear wheel coupled to the rear frame portion of the frame;
a hitch portion pivotally coupled to the front frame portion of the frame;
the hitch portion comprising first and second yoke arms extending forwardly from the front frame portion, each yoke arm having respective first end and second end portions;
a pivot coupling the first end portion of each arm to the front frame portion for pivoting about an upright axis relative to the front frame portion, wherein the distance between the second end portions of the first and second yoke arms is adjustable by pivoting the second ends of the respective yoke arms toward and away from one another about the upright axis;
a first skewer engagement latch coupled to the second end portion of the first yoke arm and a second skewer engagement latch coupled to the second end portion of the second yoke arm;
the first skewer engagement latch comprising a first housing with a first opening sized to receive a first end portion of a skewer that supports the rear wheel of a bicycle, the first skewer engagement latch comprising a first stop coupled to the first housing and movable to first stop closed and open positions, wherein with the first stop in the first stop closed position, the first stop closes the first opening sufficiently to block the removal of the first latch from the first end portion of the skewer and thereby blocks the decoupling of the first yoke arm from the first end portion of the skewer, and wherein with the first stop in the first stop open position, the first stop opens the first opening sufficiently to permit passage of the first end portion of the skewer through the first opening;
the second skewer engagement latch comprising a second housing with a second opening sized to receive a second end portion of the skewer opposite to the first end portion of the skewer, the second latch comprising a second stop coupled to the second housing and movable to second stop open and closed positions, wherein with the second stop in the second stop closed position, the second stop closes the second opening sufficiently to block the removal of the second latch from the second end portion of the skewer and thereby blocks the decoupling of the second yoke arm from the second end portion of the skewer, and wherein with the second stop in the second stop open position, the second stop opens the second opening sufficiently to permit passage of the second end portion of the skewer through the second opening;
an actuator coupled to the first and second stops and operable to move the first stop from the first stop closed position to the first stop open position and to move the second stop from the second stop closed position to the second stop open position, the actuator comprising a first cable having a first cable first end portion and a first cable second portion spaced from the first cable first end portion, the actuator comprising a second cable having a second cable first end portion and a second cable second portion spaced from the second cable first cable end portion, the first cable first end portion being coupled to the first stop and the second cable first end portion being coupled to the second stop, wherein movement of the first cable second portion in a first cable first direction moves the first stop from the first stop closed position to the first stop open position and wherein movement of the first cable second portion in a first cable second direction moves the first stop from the first stop open position to the first stop closed position, and wherein movement of the second cable second portion in a second cable first direction moves the second stop from the second stop closed position to the second stop open position and wherein movement of the second cable second portion in a second cable direction moves the second stop from the second stop open position to the second stop closed position.

2. A bicycle trailer according to claim 1 wherein the actuator comprises a first cable mover coupled to the first cable second portion and a second cable mover coupled to the second cable second portion, the first and second cable movers being coupled to the frame, the first cable mover being movable relative to the frame between first and second cable mover positions to move the first cable second portion in the respective first cable first and second directions, the second cable mover being movable relative to the frame between first and second cable mover positions to move the second cable second portion in the respective second cable first and second directions.

3. A bicycle trailer according to claim 2 wherein the first and second cable movers comprise a common cable mover coupled to the first cable second portion and to the second cable second portion, the common cable mover simultaneously moving the first cable second portion and the second cable second portion as the cable mover moves between the first and second cable mover positions.

4. A bicycle trailer according to claim 2 wherein the cable mover is supported by the hitch portion.

5. A bicycle trailer according to claim 4 wherein the hitch portion comprises a first handle arm extending upwardly and rearwardly from the first yoke arm and a second handle arm extending upwardly and rearwardly from the second yoke arm, wherein the cable mover is coupled to the first and second handle arms.

6. A bicycle trailer according to claim 5 further comprising a handle extending between the first and second handle arms, and wherein the cable mover is carried by the handle.

7. A bicycle trailer according to claim 3 wherein the cable mover comprises at least one of a lever, rotary dial, push button or push bar, or a pull cord.

8. A bicycle trailer according to claim 1 wherein the first and second cables are portions of one cable, wherein the first cable second portion and the second cable second portion are part of the one cable, and wherein the first cable first end portion and second cable first end portion are end portions of the one cable.

9. A bicycle trailer according to claim 1 wherein the actuator comprises a lever pivotally coupled to the frame and coupled to the first cable second portion and to the second cable second portion, wherein pivoting the lever in a first lever pivot direction simultaneously moves the first cable second portion and the second cable second portion in the first direction, and wherein pivoting the lever in a second lever pivot direction opposite to the first lever pivot direction simultaneously moves the first cable second portion and the second cable second portion in the second direction.

10. A bicycle trailer according to claim 9 wherein the lever is supported by the hitch portion.

11. A bicycle trailer according to claim 10 wherein the hitch portion comprises a first handle arm extending upwardly and rearwardly from the first yoke arm and a second handle arm extending upwardly and rearwardly from the second yoke arm, wherein the lever is coupled to the first and second handle arms.

12. A bicycle trailer according to claim 11 further comprising a handle extending between the first and second handle arms, and wherein the lever extends between the first and second handle arms at a location below the handle.

13. A bicycle trailer according to claim 12 wherein the handle is positioned at an elevation higher than the elevation of the front frame portion.

14. A bicycle trailer according to claim 1 comprising means for moving the first cable to move the first stop from the first stop closed position to the first stop open position and for moving the second cable to move the second stop from the second stop closed position to the second stop open position.

15. A bicycle trailer according to claim 2 wherein the first cable mover and the second cable mover comprise a common cable mover coupled to frame and to the first cable second portion and to the second cable second portion, the common cable mover being movable relative to the frame between first and second cable mover positions to simultaneously move the first cable second portion in the first cable first direction and the second cable second portion in the second cable first direction, wherein simultaneous movement of the first cable second portion in the first cable first direction and movement of the second cable second portion in the second cable first direction simultaneously moves the first stop to the first stop open position and the second stop to the second stop open position.

16. A bicycle trailer according to claim 15 comprising a spring coupled the common cable mover and to the frame and biasing the common cable mover to the first cable mover position to thereby bias the first stop to the first stop closed position and the second stop to the second stop closed position.

17. A bicycle trailer according to claim 1 comprising a first handle arm with a first handle arm first end portion connected to the first yoke arm and a first handle arm second end portion spaced from the first handle arm first end portion, the first handle arm extending upwardly from the first yoke arm; a second handle arm with a second handle arm first end portion connected to the second yoke arm and a second handle arm second end portion spaced from the second handle arm first end portion, the second handle arm extending upwardly from the second yoke arm; and a handle cross member interconnecting the first handle arm second end portion and the second handle arm second end portion; at least one lever carried by the handle cross member and being coupled to the front frame portion through the first and second handle arms and through the first and second yoke arms and the pivot, the at least one lever being coupled to the first cable second end portion and to the second cable second end portion, the at least one lever being movable from a first position to a second position, the at least one lever being movable in a first direction to the second position and in a second direction to the first position, wherein movement of the at least one lever from the first position to the second position moves the first and second stops to their respective first and second stop open positions.

18. A bicycle trailer according to claim 17 wherein the first and second handle arms extend upwardly and rearwardly to position the handle above the front frame portion.

19. A bicycle trailer according to claim 17 wherein the first cable extends along the first yoke arm and within the interior of the first handle arm to the handle, and wherein the second cable extends along the second yoke arm and within the interior of the second handle arm to the handle.

20. A bicycle trailer according to claim 17 wherein the first and second handle arms and handle comprise a U-shaped handle support for the at least one lever.

21. A bicycle trailer according to claim 1 wherein the first and second latches each comprise spherical skewer engagement surfaces.

22. A bicycle trailer according to claim 1 wherein the first end of the first yoke arm comprises a first hinge portion and the first end of the second yoke arm comprises a second hinge portion, the first and second hinge portions interfitting with one another and comprising portions of the pivot, and the trailer further comprising a hinge pin that couples the first and second hinge portions to the trailer front portion, the longitudinal axis of the hinge pin comprising the upright axis.

23. A bicycle trailer according to claim 22 comprising at least one sleeve inserted through the interfitting hinge portions through which the hinge pin is inserted, wherein the hinge pin is removable and whereupon removal of the hinge pin allows detachment of the first and second hinge portions and thereby the first and second yoke arms from the bicycle trailer frame and wherein the at least one sleeve retains the first and second hinge portions interfitting together when the first and second hinge portions and first and second yoke arms are separated from the trailer frame.

24. A bicycle trailer according to claim 22 wherein the first and second hinge portions comprise stops positioned to limit the extent to which the minimum and maximum distances between the second end portions of the first and second yoke arms.

25. A bicycle trailer according to claim 1 wherein the frame comprises spaced apart upper and lower pivot supports projecting forwardly from respective upper and lower portions of the front frame portion, the first end of the first yoke arm comprises a first hinge portion and the first end of the second yoke arm comprises a second hinge portion, the first and second hinge portions interfitting with one another and comprising portions of the pivot, an inner sleeve defining a hinge pin receiving passageway extending longitudinally through the inner sleeve, an outer sleeve defining a longitudinally extending sleeve receiving passageway, the inner sleeve being positioned within the outer sleeve, the outer sleeve being inserted through the first and second hinge portions and retaining the first and second hinge portions interfitting with one another, the sleeves being positioned between the upper and lower pivot supports, the pivot including a hinge pin inserted through the hinge pin receiving passageway and coupled to the upper and lower pivot supports to couple the interfitting hinge portions and thereby the first and second yoke arms to the front frame portion.

26. A bicycle trailer according to claim 25 wherein the pivot comprises upper and lower end members, the outer sleeve extending through the upper and lower end members and being coupled to the end members to retain the end members, the first and second hinge portions and thereby the first and second yoke arms together as a yoke assembly, wherein the hinge pin is inserted through the upper and lower pivot supports, the upper and lower end members, the first and second hinge portions and the inner sleeve to couple the yoke assembly to the front frame portion, wherein the hinge pin is removable such that the yoke assembly is separable as a unit from the trailer frame upon removal of the hinge pin.

27. A bicycle trailer according to claim 26 wherein the first and second hinge portions comprise stops positioned to limit the extent to which the minimum and maximum distances between the second end portions of the first and second yoke arms, and wherein the upper and lower pivot supports include respective slots that face one another and that are sized to slidably receive respective upper and lower end portions of the outer sleeve.

28. A bicycle trailer according to claim 1 in combination with a skewer for the rear wheel of a bicycle, the skewer comprising a first end portion comprising a first spherical latch engagement surface portion and a second skewer end portion comprising a second spherical latch engagement surface portion; the first skewer engagement latch comprising a first latch spherical engaging surface portion that is positioned against the first spherical latch engagement surface portion at least when the first skewer engagement latch receives the first skewer end portion and the first stop is in the first stop closed position; and second skewer engagement latch comprising a second latch spherical engaging surface portion that is positioned against the second spherical latch engagement surface portion at least when the second skewer engagement latch receives the second skewer end portion and the second stop is in the first stop closed position.

29. A bicycle trailer according to claim 1 in combination with a skewer comprising a skewer body having first and second skewer body end portions, wherein each of the first and second skewer body end portions comprises respective first and second latch engagement surface portion, wherein at least a portion of each of the first and second latch engagement surface portions are spherical, the first skewer engagement latch comprising a first skewer end portion engagement surface and the second skewer engagement latch comprising a second skewer end portion engagement surface, the first and second skewer end portion engagement surfaces being at least in part spherical, the first latch engagement surface portion engaging the first skewer end portion engagement surface at least when the first skewer engagement latch receives the first skewer end portion and the first stop is in the first stop closed position, and the second latch engagement surface portion engaging the second skewer end portion engagement surface at least when the second skewer engagement latch receives the second skewer end portion and the second stop is in the second stop closed position.

30. A bicycle trailer according to claim 29 wherein the skewer has a longitudinal axis, and wherein the first and second latch engaging surface portions each include respective side portions through which the longitudinal axis of the skewer extends, the first and second latch engaging surface portions each being entirely spherical except for the first and second side portions.

31. A bicycle trailer comprising:
a bicycle trailer frame;
a hitch portion coupled to the frame;
the hitch portion comprising first and second yoke arms extending forwardly from the front frame portion, each yoke arm having respective first end and second end portions;
a first skewer engagement latch coupled to the second end portion of the first yoke arm and a second skewer engagement latch coupled to the second end portion of the second yoke arm;

the first skewer engagement latch comprising a first housing with a first opening sized to receive a first end portion of a skewer that supports the rear wheel of a bicycle, the first skewer engagement latch comprising a first stop coupled to the first housing and movable to first stop closed and open positions, wherein with the first stop in the first stop closed position, the first stop closes the first opening sufficiently to block the removal of the first latch from the first end portion of the skewer and thereby blocks the decoupling of the first yoke arm from the first end portion of the skewer, and wherein with the first stop in the first stop open position, the first stop opens the first opening sufficiently to permit passage of the first end portion of the skewer through the first opening;

the second skewer engagement latch comprising a second housing with a second opening sized to receive a second end portion of the skewer opposite to the first end portion of the skewer, the second latch comprising a second stop coupled to the second housing and movable to second stop open and closed positions, wherein with the second stop in the second stop closed position, the second stop closes the second opening sufficiently to block the removal of the second latch from the second end portion of the skewer and thereby blocks the decoupling of the second yoke arm from the second end portion of the skewer, and wherein with the second stop in the second stop open position, the second stop opens the second opening sufficiently to permit passage of the second end portion of the skewer through the second opening;

an actuator coupled to the first and second stops and operable to move the first stop from the first stop closed position to the first stop open position and to move the second stop from the second stop closed position to the second stop open position, the actuator comprising a first cable having a first cable first end portion and a first cable second portion spaced from the first cable first end portion, the actuator comprising a second cable having a second cable first end portion and a second cable second portion spaced from the second cable first cable end portion, the first cable first end portion being coupled to the first stop and the second cable first end portion being coupled to the second stop, wherein movement of the first cable second portion in a first cable first direction moves the first stop from the first stop closed position to the first stop open position and wherein movement of the first cable second portion in a first cable second direction moves the first stop from the first stop open position to the first stop closed position, and wherein movement of the second cable second portion in a second cable first direction moves the second stop from the second stop closed position to the second stop open position and wherein movement of the second cable second portion in a second cable direction moves the second stop from the second stop open position to the second stop closed position.

32. A bicycle trailer according to claim 31 wherein the actuator comprises a first cable mover coupled to the first cable second portion and a second cable mover coupled to the second cable second portion, the first and second cable movers being coupled to the frame, the first cable mover being movable relative to the frame between first and second cable mover positions to move the first cable second portion in the respective first cable first and second directions, the second cable mover being movable relative to the frame between first and second cable mover positions to move the second cable second portion in the respective second cable first and second directions, wherein the first and second cable movers comprise a common cable mover coupled to the first cable second portion and to the second cable second portion, the common cable mover simultaneously moving the first cable second portion and the second cable second portion as the cable mover moves between the first and second cable mover positions.

33. A bicycle trailer according to claim 32 wherein the hitch portion comprises a first handle arm extending upwardly and rearwardly from the first yoke arm and a second handle arm extending upwardly and rearwardly from the second yoke arm, a handle extending between the first and second handle arms, and wherein the cable mover is carried by the handle.

34. A bicycle trailer according to claim 33 wherein the cable mover comprises at least one of a lever, rotary dial, push button or push bar, or a pull cord.

35. A bicycle trailer according to claim 34 wherein the first and second cables are portions of one cable, wherein the first cable second portion and the second cable second portion are part of the one cable, and wherein the first cable first end portion and second cable first end portion are end portions of the one cable.

36. A bicycle trailer according to claim 34 wherein the handle is positioned at an elevation higher than the elevation of the front of the frame.

37. A bicycle trailer according to claim 31 comprising means for moving the first cable to move the first stop from the first stop closed position to the first stop open position and for moving the second cable to move the second stop from the second stop closed position to the second stop open position.

* * * * *